US 9,976,583 B2

(12) United States Patent
Lopez et al.

(10) Patent No.: US 9,976,583 B2
(45) Date of Patent: May 22, 2018

(54) THREADED ADJUSTABLE-HEIGHT INSERTS AND RELATED METHODS

(71) Applicant: The Boeing Company, Chicago, IL (US)

(72) Inventors: Karina R. Lopez, Anaheim, CA (US); Hayden S. Osborn, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days. days.

(21) Appl. No.: 15/090,146

(22) Filed: Apr. 4, 2016

(65) Prior Publication Data

US 2017/0284434 A1 Oct. 5, 2017

(51) Int. Cl.
 *F16B 5/01* (2006.01)
 *F16B 5/02* (2006.01)
 *B32B 7/08* (2006.01)

(52) U.S. Cl.
 CPC ............... *F16B 5/01* (2013.01); *B32B 7/08* (2013.01); *F16B 5/02* (2013.01); *B32B 2250/40* (2013.01); *B32B 2605/18* (2013.01)

(58) Field of Classification Search
 CPC ..... F16B 5/01; F16B 5/02; B32B 7/08; B32B 2605/18; B32B 2250/40
 See application file for complete search history.

(56) References Cited

U.S. PATENT DOCUMENTS

| | | | |
|---|---|---|---|
| 2,883,012 A * | 4/1959 | Hoffman | .............. F16B 5/02 403/408.1 |
| 3,078,002 A | 2/1963 | Rodgers, Jr. | |
| 3,384,142 A | 5/1968 | Phelan | |
| 3,579,942 A | 5/1971 | Cole | |
| 3,601,278 A | 8/1971 | Merz et al. | |

(Continued)

FOREIGN PATENT DOCUMENTS

| | | |
|---|---|---|
| EP | 0 273 515 | 7/1988 |
| EP | 2 610 505 | 7/2013 |

(Continued)

OTHER PUBLICATIONS

Printout of The Young Engineers, Inc., New Products webpage, available at least as early as Apr. 6, 2015. Downloaded from http://www.youngengineers.com/newproducts.aspx.

(Continued)

*Primary Examiner* — Jeanette E Chapman
(74) *Attorney, Agent, or Firm* — DASCENZO Intellectual Property Law, P.C.

(57) ABSTRACT

A threaded adjustable-height insert may be installed in a bore of a sandwich panel, such that the insert may be configured to transfer a load to the sandwich panel. The threaded adjustable-height insert may include a first insert part and a second insert part that may be selectively operatively positioned with respect to each other. The overall height of the threaded adjustable-height insert may be adjusted by longitudinally sliding the second insert part with respect to the first insert part and rotating the second insert part with respect to the first insert part. Presently disclosed threaded adjustable-height inserts may be configured for flush installation in a sandwich panel. Methods of installing such threaded adjustable-height inserts and adjusting the height of the same are also disclosed.

15 Claims, 10 Drawing Sheets

(56) References Cited

U.S. PATENT DOCUMENTS

| | | | |
|---|---|---|---|
| 3,621,557 A | | 11/1971 | Cushman et al. |
| 3,678,535 A | | 7/1972 | Charles |
| 3,678,980 A | | 7/1972 | Gutshall |
| 3,962,843 A | * | 6/1976 | King, Jr. .............. B23P 9/025 |
| | | | 285/382.4 |
| 4,266,687 A | | 5/1981 | Cummings |
| 4,423,819 A | | 1/1984 | Cummings |
| 4,509,308 A | | 4/1985 | Dettfurth et al. |
| 4,717,612 A | | 1/1988 | Shackleford |
| 4,981,735 A | * | 1/1991 | Rickson .................. F16B 5/01 |
| | | | 156/92 |
| 5,093,957 A | * | 3/1992 | Do ........................ E04C 2/365 |
| | | | 16/2.1 |
| 5,253,967 A | * | 10/1993 | Orban .................... F16B 33/00 |
| | | | 29/525.11 |
| 5,620,287 A | * | 4/1997 | Pratt ....................... F16B 5/01 |
| | | | 411/361 |
| 6,488,460 B1 | | 12/2002 | Smith et al. |
| 6,641,343 B1 | * | 11/2003 | Duran ................ F16B 19/109 |
| | | | 411/348 |
| 8,382,415 B1 | * | 2/2013 | Goldbaum ........... F16B 39/122 |
| | | | 411/366.1 |
| 8,814,430 B2 | | 8/2014 | Vetemik et al. |
| 2004/0265091 A1 | * | 12/2004 | Cheung ................. B29C 65/54 |
| | | | 411/338 |
| 2005/0103433 A1 | | 5/2005 | Flynn et al. |
| 2012/0174765 A1 | | 7/2012 | Kunda |
| 2017/0036750 A1 | | 2/2017 | Lewis et al. |
| 2017/0253006 A1 | * | 9/2017 | Lopez ...................... B32B 3/12 |

FOREIGN PATENT DOCUMENTS

| | | |
|---|---|---|
| GB | 861884 | 3/1961 |
| GB | 1059928 | 2/1967 |
| GB | 2017857 | 10/1979 |
| WO | WO 2009/050239 A1 | 4/2009 |
| WO | WO 2014/088600 A1 | 6/2014 |
| WO | WO 2017/049130 A1 | 3/2017 |

OTHER PUBLICATIONS

Printout of screenshots of Dupo, Threaded Inserts webpage, available at least as early as Apr. 6, 2015. Downloaded from http://dupo.nl/en/categorie/plastic-metal-spare-parts/threaded-inserts/.

Printout of Shur-Lok Products, Fasteners for Sandwich Structure webpage, available at least as early as Jan. 14, 2016. Downloaded from http://www.shur-lok.eu/contents/products/sandwich.html.

"TYE2400 Series Insert: Molded In, Adjustable, Threaded, Self-Locking, Clearance Hole, Sandwich Panel," The Young Engineers, available at least as early as Mar. 31, 1989.

Printout of The Young Engineers, Inc., Composite Fasteners, Non-metallic Fasteners webpage, available at least as early as Jan. 14, 2016. Downloaded from http://www.youngengineers.com/Composites.aspx.

Printout of The Young Engineers, Inc., Floating Nut Fasteners webpage, available at least as early as Jan. 14, 2016. Downloaded from http://www.youngengineers.com/Floaters.aspx.

Printout of The Young Engineers, Inc., Loret Isolator Inserts webpage, available at least as early as Jan. 14, 2016. Downloaded from http://www.youngengineers.com/Isolators.aspx.

Printout of The Young Engineers, Inc., Molded in Threaded Fasteners webpage, available at least as early as Jan. 14, 2016. Downloaded from http://www.youngengineers.com/MoldedInThreaded.aspx.

Printout of MSC Industrial Supply Co., Brass Press Fit Fastener webpage, available at least as early as Jan. 8, 2016. Downloaded from http://www.mscdirect.com/industrialtools/brass-press-fit-fastener.html.

Extended European Search Report, European Patent Office, issued for related European Application No. 17154110.5 dated Jul. 4, 2017.

* cited by examiner

THREADED ADJUSTABLE-HEIGHT INSERTS AND RELATED METHODS

FIELD

The present disclosure relates to threaded adjustable-height inserts and related methods.

BACKGROUND

Sandwich panels (e.g., a core sandwiched between two layers of material, or skins) are often used in the construction of aircraft, because they have high strength-to-weight ratios. Depending on the specific location and application of a sandwich panel in an aircraft, one or more round inserts may be required to be inserted within or through a sandwich panel in order to affix one or more other structures or fasteners to the panel. Round inserts may be used to transfer localized loads (e.g., via a pin, bolt, screw, joint, or other structure) to the sandwich panel, such as to fasten the sandwich panel to another structure, join multiple sandwich panels to each other, and/or attach one or more external objects to the sandwich panel. For example, round inserts may provide a channel for wire bundles to be passed from one side of the sandwich panel to the other, or round inserts may be configured to receive a pin or bolt or other fastener in order to secure another panel or object to the sandwich panel, via the round insert. In the aerospace industry, such sandwich panels and round inserts may be used to assemble the interior main structure and/or secondary structures of the aircraft, and/or may be used to form floor boards, wall panels, galleys, stow bins, overhead compartments, lavatories, and/or other structures within the aircraft. Such sandwich panels and round inserts are also used in other industries.

FIGS. 1 and 2 illustrate a conventional round insert 10 installed in a sandwich panel 11, shown schematically in cross-section. Sandwich panel 11 may include a core 13 sandwiched between a first skin 15 and a second skin 17. First skin 15 and second skin 17 may be rigid or semi-rigid skins, and are typically relatively thin compared to core 13, which is typically formed of a lightweight material. Conventional round insert 10 may be inserted into a circular bore 19 formed in sandwich panel 11, which may be a blind bore 21 (FIG. 1) or a through-bore 23 (FIG. 2). Blind bore 21 may extend through one of the skins (e.g., first skin 15, as shown in FIG. 1) and into the core 13, towards the other skin (e.g., second skin 17), whereas through-bore 23 may extend entirely through first skin 15, second skin 17, and core 13. As shown in FIGS. 1 and 2, a flange portion 27 of conventional round insert 10 may be substantially flush with one of more of first skin 15 and second skin 17, or, as shown in FIG. 3, flange portion 27 of conventional round insert 10 may lay on top of (e.g., on an outer surface of) first skin 15 or second skin 17.

In conventional techniques, an adhesive material, such as a potting compound or epoxy, is injected through potting holes, or vents, in conventional round insert 10 to fill a gap or space 29 between conventional round insert 10 and core 13 of sandwich panel 11. The adhesive material, once fully cured, serves to secure the insert in place within circular bore 19 of sandwich panel 11, and is designed to prevent relative movement of conventional round insert 10 with respect to sandwich panel 11 and retain conventional round insert 10 within circular bore 19 (e.g., resisting pull-out, rotation, and lateral movement of conventional round insert 10) once the adhesive compound dries, solidifies, and/or cures.

However, due to variations in sizes of sandwich panels and depths of bores, dozens of different sizes of conventional inserts are needed. Often, the incorrect size insert may be installed into a given bore, due to selecting the wrong insert, and/or inaccurately determining the needed size. For example, in situations where only one side of the sandwich panel is accessible, measuring the thickness of the sandwich panel to determine the correct insert size may be difficult. Installing the wrong insert may result in significant scrap and/or rework costs. Furthermore, due to the large number of inserts that may need to be installed in a given sandwich panel or apparatus, shortages of particular sizes are common during manufacturing, due to inaccuracies. Prior art solutions have included inserts having an adjustable height, however these prior art inserts include a flange (such as flange portion 27 shown in FIG. 3) that sits on the surface of the sandwich panel, such that the insert is not flush with the panel. While these prior art inserts may address some issues in the field, they are not suitable for applications requiring a flush installation. Such issues with conventional inserts and methods of installing the same within a sandwich panel are on-going and problematic in a variety of industries.

SUMMARY

Presently disclosed threaded adjustable-height inserts and related methods (e.g., methods of installing one or more such inserts in a sandwich panel and adjusting the height of the threaded adjustable-height insert) may address one or more issues with conventional inserts and related methods. For example, one example of a threaded adjustable-height insert according to the present disclosure may include a first insert part and a second insert part. The first insert part may include a first flange having a first upper surface and a first lower surface, a first neck extending from the first upper surface of the first flange to a first neck end region, and a first hole extending at least through the first neck and defined at least partially by a first inner surface of the first neck. The first neck also may include a first outer surface opposite the first inner surface. The second insert part may include a second flange having a second upper surface and a second lower surface, a second neck extending from the second lower surface of the second flange to a second neck end region, and a second hole extending through the second neck and the second flange, wherein the second hole is partially defined by a second inner surface of the second neck.

The second insert part may be configured to be selectively operatively positioned with respect to the first insert part such that the second inner surface of the second neck has a threaded engagement with at least a portion of the first neck. The adjustable-height insert may be configured to have a selectively adjustable overall height such that moving the second insert part with respect to the first insert part such that the second flange is moved towards the first flange reduces the overall height of the adjustable-height insert. Further, the first hole and the second hole may be at least substantially concentric when the second insert part is operatively positioned with respect to the first insert part. The first insert part and the second insert part may be slidably translatable and rotatable relative to each other. Contrary to prior art inserts, presently disclosed adjustable-height inserts may be configured for flush installations without requiring access to both sides of the sandwich panel.

Such threaded adjustable-height inserts may be configured to be installed in a bore of a sandwich panel according to presently disclosed methods. The sandwich panel may include a first skin, a second skin opposite the first skin, and a core therebetween. Methods of installing a threaded adjustable-height insert into a respective bore of a sandwich panel may include installing the threaded adjustable-height insert such that at least a portion of the first neck and at least a portion of the second neck of the threaded adjustable-height insert are positioned within the respective bore in a core of the sandwich panel, and adjusting the height of the threaded adjustable-height insert until the second upper surface of the second flange is at least substantially flush with the sandwich panel. The height of the threaded adjustable-height insert may be adjusted, for example, by moving the second insert part with respect to the first insert part, such that the second flange is moved towards the first flange, wherein the adjusting the height may include longitudinally sliding the second insert part with respect to the first insert part and rotating the first insert part with respect to the second insert part.

DESCRIPTION

Figure 1:
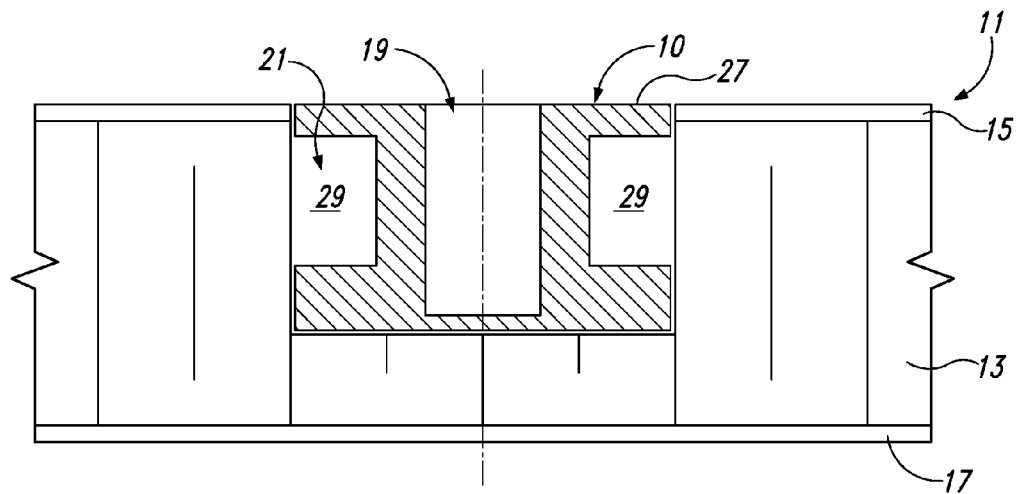
FIG. 1 is a schematic, cross-section view of a prior art insert positioned within a blind bore formed in a sandwich panel, the insert being flush with the sandwich panel skin.
Figure 2:
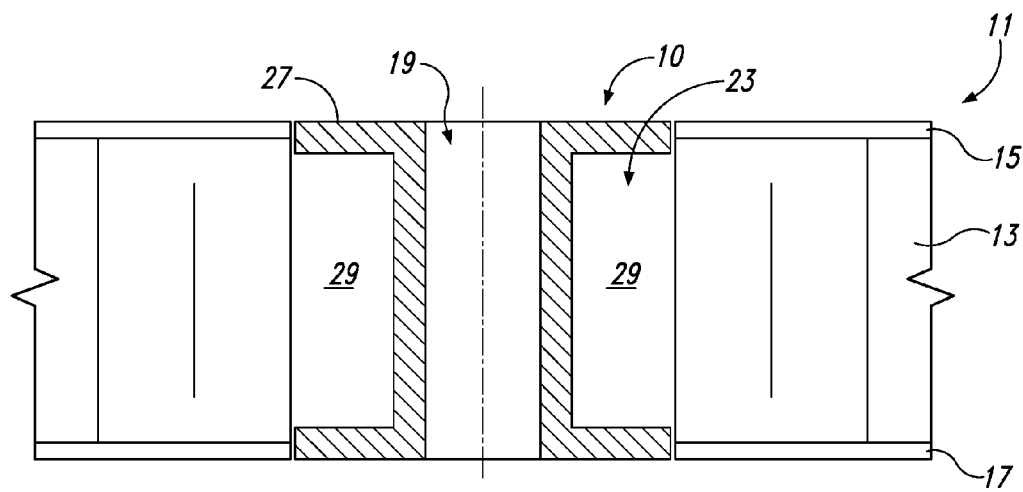
FIG. 2 is a schematic, cross-section view of a prior art insert positioned within a through-bore formed in a sandwich panel, the insert being flush with the sandwich panel skin.
Figure 3:
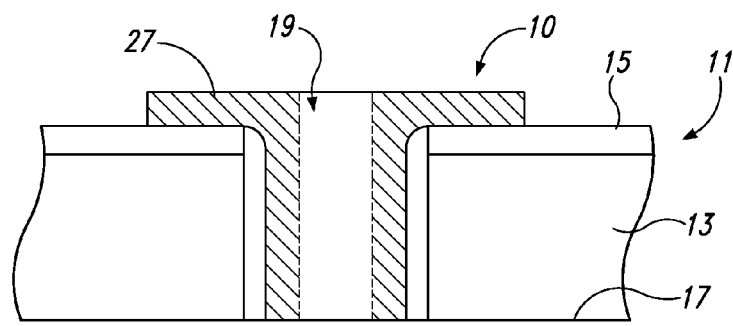
FIG. 3 is a schematic, cross-section view of a prior art insert positioned with respect to a sandwich panel.
Figure 4:
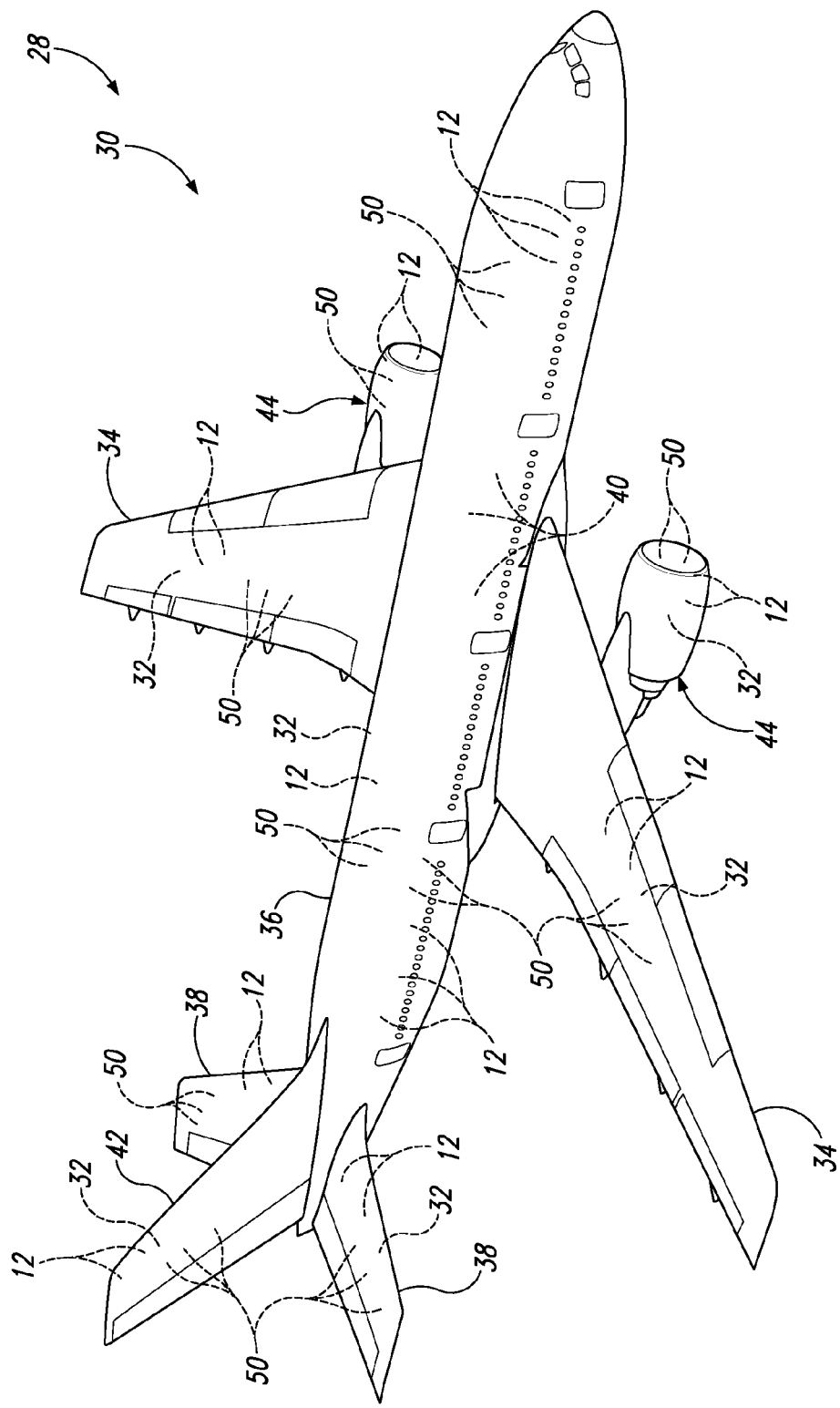
FIG. 4 is a perspective, schematic view of illustrative, non-exclusive examples of an apparatus that may include one or more sandwich panels including one or more threaded adjustable-height inserts according to the present disclosure.

With reference to FIG. 4, one or more threaded adjustable-height inserts 50 according to the present disclosure may be installed in one or more sandwich panels 12 (which may be of similar construction to sandwich panel 11 from FIGS. 1-3). For example, such sandwich panels 12 including one or more adjustable-height inserts 50 may be useful in the aerospace, automotive, electronic, construction, military, recreation, and/or motorsport industries. In FIG. 4, an example of an apparatus 28 that may include one or more sandwich panels 12 and adjustable-height inserts 50 generally is illustrated in the form of an aircraft 30. Aircraft 30 may take any suitable form, including commercial aircraft, military aircraft, or any other suitable aircraft. While FIG. 4 illustrates an aircraft 30 in the form of a fixed wing aircraft, other types and configurations of aircraft are within the scope of aircraft 30 according to the present disclosure, including (but not limited to) rotorcraft and helicopters.

Figure 5:
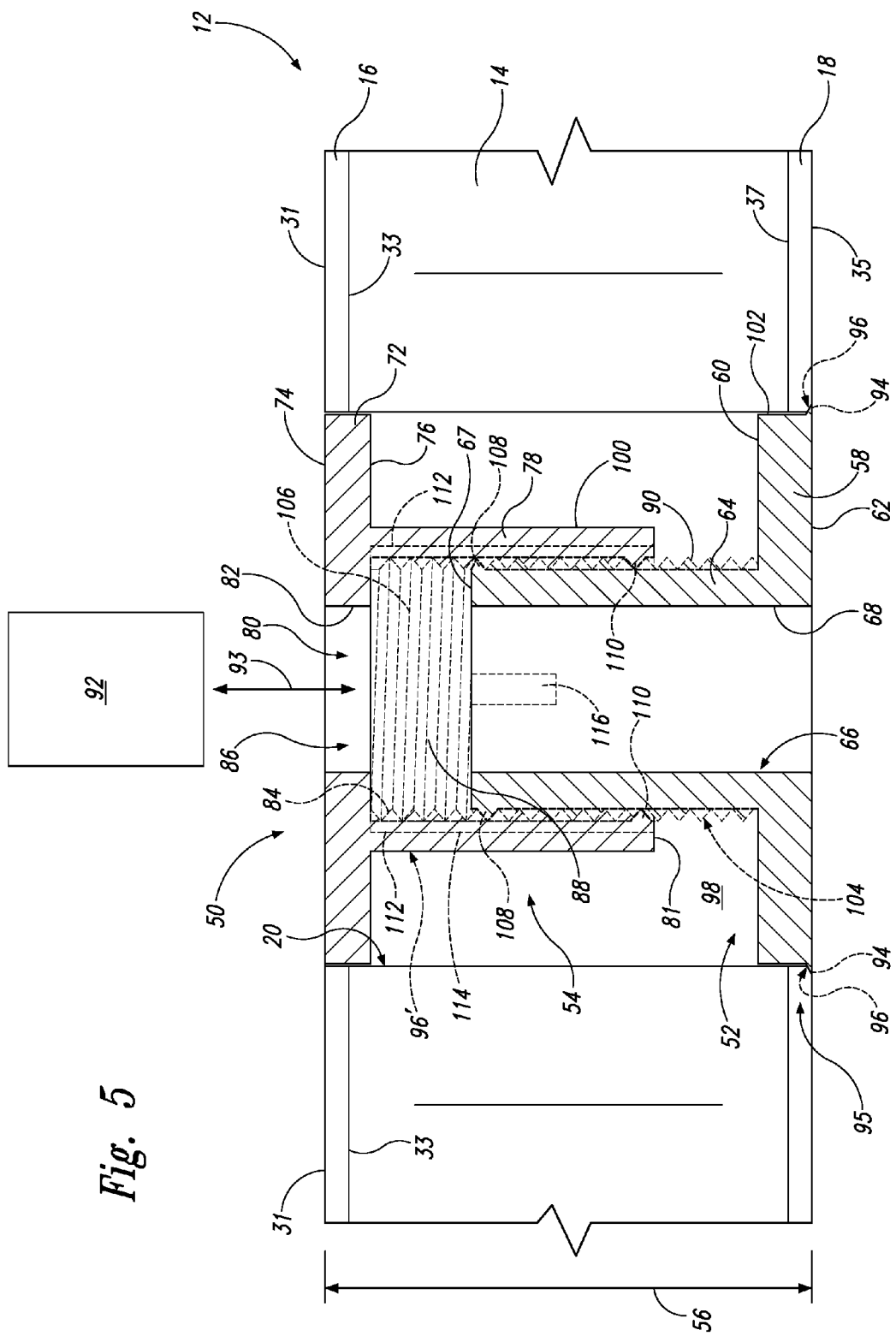
FIG. 5 is a schematic view of illustrative, non-exclusive examples of threaded adjustable-height inserts according to the present disclosure, positioned within a bore of a sandwich panel.

Apparatus 28 (e.g., aircraft 30) may include one or more structures 32 formed from one or more sandwich panels 12, one or more of which may be composite panels. As shown in FIG. 5, each sandwich panel 12 includes a core 14 formed of a relatively lightweight material, such as a plurality of elongate cells, typically having hexagonal or rectangular cross-sections. Such cores 14 may be referred to as honeycomb cores, but other shapes and configurations also may be used, such as a corrugated structure and/or foam materials. Core 14 may include an open-cell structure and/or a closed-cell structure. Core 14 may be formed of, for example, foam, aluminum, Nomex® (aramid), carbon, Korex, Kevlar®, fiberglass, polyethersulfone, polyvinylchloride, polyurethane, polyethylene foam, polystyrene foam, balsa wood, syntactic foam, a honeycomb structure, a polymer honeycomb, a thermoplastic honeycomb, stainless steel, polycarbonate, and/or polypropylene.

Sandwich panels 12 include at least two skins, first skin 16 being positioned on one side of core 14 and second skin 18 being positioned on another (opposing) side of core 14, arranged to form a three-layer sandwich structure. First skin 16 includes a first outer panel surface 31 and a first inner panel surface 33 opposite first outer panel surface 31. Second skin 18 includes a second outer panel surface 35 and a second inner panel surface 37 opposite second outer panel surface 35. Core 14 generally extends between first inner panel surface 33 and second inner panel surface 37, while first outer panel surface 31 and second outer panel surface 35 form the outer surfaces of sandwich panel 12. The panel skins (e.g., first skin 16 and second skin 18) are typically rigid, with core 14 spanning between the skins. First skin 16 and second skin 18 may be formed of, for example, a laminate of fiberglass-reinforced polymer, a laminate of carbon fiber-reinforced polymer, a thermoset polymer, an epoxy, sheet metal, carbon, aramid, aluminum, steel, plywood, balsa, teak, and/or hardwood. First skin 16 and second skin 18 may be formed of the same material(s) in some examples, or may be formed of different materials in other examples.

Again with reference to FIG. 4, structures 32 may include one or more sandwich panels 12, joints formed between two or more sandwich panels 12, and/or three-dimensional structures formed using one or more sandwich panels 12. As illustrative, non-exclusive examples, structures 32 may be utilized in such aircraft structures as wings 34, fuselages 36, horizontal stabilizers 38, overhead storage bins 40, vertical stabilizers 42, and engine housings 44; however, other components of aircraft 30 additionally or alternatively may include structures 32 such as sandwich panels 12 and/or joints formed between two or more sandwich panels 12. Other applications in aircraft 30 for sandwich panels 12 including one or more adjustable-height inserts 50 according to the present disclosure include floor panels, interior walls, food handling galley assemblies, wing control surfaces, passenger storage racks, thrust deflector assemblies, capsule panels, ablative shields for nose cones, instrumentation enclosures and shelves, and bulkhead panels. In other industries, examples of apparatus 28 (including one or more sandwich panels 12 and adjustable-height inserts 50) may include or be a portion of space satellites, electronic radome construction, transit vehicles, shipping containers, shelters, large antennae or disk reflectors, refrigeration panels, rapid transit floor panels, shipboard electronic deck shelters, cargo pallets, automobile bodies, architectural curtain walls, partitions, divider panels, expandable hospital shelters, and/or interior structures of an assembly.

Turning now to FIG. 5, examples of threaded adjustable-height inserts 50 are schematically represented, shown having been installed within a bore 20 of sandwich panel 12. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Generally, threaded adjustable-height insert 50 may be a two part insert, having a first insert part 52 and a second insert part 54. Second insert part 54 may be configured to be selectively operatively positioned with respect to first insert part 52 and installed within bore 20 of sandwich panel 12. An overall height 56 of threaded adjustable-height insert 50 may be selectively adjusted, such as by moving second insert part 54 with respect to first insert part 52, as will be explained in more detail below. In this manner, the height 56 of threaded adjustable-height insert 50 may be selectively adjusted so that threaded adjustable-height insert 50 may be installed such that it is at least substantially flush with an outer surface of sandwich panel 12 (e.g., first outer panel surface 31 or second outer panel surface 35).

First insert part 52 may include a first flange 58 having a first upper surface 60 and a first lower surface 62, a first neck 64, and a first hole 66 extending at least through first neck 64. First neck 64 extends from first upper surface 60 of first flange 58 to a first neck end region 67. First hole 66 may be at least partially defined by a first inner surface 68 of first neck 64. In some examples, first hole 66 may extend all the way through first insert part 52, extending through first flange 58 in addition to first neck 64. In some examples, first hole 66 may extend only partially through first neck 64 or only partially through first flange 58.

Second insert part 54 may include a second flange 72 having a second upper surface 74 and a second lower surface 76, a second neck 78, and a second hole 80 extending through second neck 78 and second flange 72. Second neck 78 extends from second lower surface 76 of second flange 72 to a second neck end region 81. Second hole 80 may be at least partially defined by a second inner surface 84 of second neck 78 and a third inner surface 82 of second flange 72. As shown in FIG. 5, second hole 80 may have a smaller diameter at a first portion 86 extending through second flange 72, and a larger diameter at a second portion 88 extending through second neck 78. First portion 86 of second hole 80 may have substantially the same dimensions as first hole 66, whereas second portion 88 of second hole 80 may have an inner diameter that is approximately equal to or slightly bigger than the outer diameter of first neck 64. Thus, second insert part 54 may be configured to be selectively operatively positioned with respect to first insert part 52 such that second inner surface 84 of second neck 78 engages a first outer surface 90 of first neck 64.

For example, threaded adjustable-height insert 50 may be configured such that there is a threaded engagement between at least a portion of second inner surface 84 of second neck 78 and at least a portion of first neck 64 (e.g., first outer surface 90 of first neck 64). In this configuration (e.g., when second insert part 54 is operatively positioned with respect to first insert part 52), threaded adjustable-height insert 50 may be configured such that first hole 66 and second hole 80 are at least substantially concentric. In this manner, a secondary object 92, such as a bolt or other fastener, may be inserted through threaded adjustable-height insert 50 (e.g., through second hole 80 and into and/or through first hole 66). Such secondary objects 92 may be useful for securing hardware or other structures to sandwich panel 12, transferring loads to sandwich panel 12, securing items to sandwich panel 12, and/or passing objects from one side of sandwich panel 12 to the other (e.g., from first skin 16 to second skin 18).

Overall height 56 of threaded adjustable-height insert 50 (defined as the perpendicular distance between second upper surface 74 of second flange 72 and first lower surface 62 of first flange 58) may be selectively adjustable by moving second insert part 54 with respect to first insert part 52. For example, moving second insert part 54 such that second flange 72 is moved towards first flange 58 reduces overall height 56 of threaded adjustable-height insert 50. In some examples, second insert part 54 may be slid longitudinally (e.g., in directions indicated by arrow 93) such that second neck 78 travels longitudinally along and with respect to first neck 64 (e.g., a force may be applied to second insert part 54), and such that second flange 72 is moved towards first flange 58 and the height of threaded adjustable-height insert 50 is reduced. In other words, first insert part 52 and second insert part 54 may be slidably translatable with respect to one another.

First insert part 52 and second insert part 54 also may be rotatable relative to each other. For example, radial movement of (e.g., rotation of) second insert part 54 with respect to first insert part 52, before or after threaded adjustable-height insert 50 is at least partially inserted into bore 20 may also be used to adjust overall height 56 of threaded adjustable-height insert 50. In some examples, selectively rotating second insert part 54 with respect to first insert part 52 in a first direction may reduce the overall height of threaded adjustable-height insert 50, and selectively rotating second insert part 54 with respect to first insert part 52 in a second direction opposite the first direction may increase the overall height of threaded adjustable-height insert 50. Additionally or alternatively, overall height 56 of threaded adjustable-height insert 50 may be adjustable by expanding a portion of second insert part 54, such that a portion of second insert part 54 may temporarily radially expand and be ratcheted over features of first insert part 52 in order to adjust overall height 56.

In some examples, first insert part 52 may include a first threaded portion 104. For example, first outer surface 90 of first neck 64 may include first threaded portion 104. In some examples, first threaded portion 104 may extend along substantially the entire length of first neck 64, such as substantially from first upper surface 60 of first flange 58 to first neck end region 67. In some examples, first threaded portion 104 may extend along only a portion of first neck 64. In some examples, first threaded portion 104 may have a double threaded pitch. Additionally or alternatively, first threaded portion 104 may be an external thread. Second insert part 54 may include a second threaded portion 106. For example, second inner surface 84 of second neck 78 may include second threaded portion 106. In some examples, second threaded portion 106 may extend along substantially the entire length of second neck 78, such as substantially from second lower surface 76 of second flange 72 to second neck end region 81. In some examples, second threaded portion 106 may extend along only a portion of second neck 78. In some examples, second threaded portion 106 may have a double threaded pitch. Additionally or alternatively, second threaded portion 106 may be an internal thread.

In some examples, threaded adjustable-height insert 50 may include thread engagement clips that are configured to engage a threaded portion. For example, first insert part 52 may include one or more first thread engagement clips 108 that are configured to engage second threaded portion 106 of second insert part 54 such that rotation of second insert part 54 with respect to first insert part 52 causes first engagement clips 108 to travel along second threaded portion 106. One or more first thread engagement clips 108 may be positioned to extend radially outwardly from (e.g., project outwardly from) first outer surface 90 of first neck 64, and engage with second inner surface 84 of second neck 78 (e.g., with second threaded portion 106). First thread engagement clips 108 may be spaced apart, such as substantially equidistantly, about first outer surface 90 of first neck 64. First thread engagement clips 108 may be positioned adjacent first neck end region 67, as indicated in FIG. 5. Each first thread engagement clip 108 may be a partial thread in some examples.

Similarly, second insert part 54 may include one or more second thread engagement clips 110 that are configured to engage first threaded portion 104 of first insert part 52 such that rotation of second insert part 54 with respect to first insert part 52 causes second thread engagement clips 110 to travel along first threaded portion 104. One or more second thread engagement clips 110 may be positioned to extend radially inwardly from (e.g., project inwardly from) second inner surface 84 of second neck 78, and engage with first outer surface 90 of first neck 64 (e.g., with first threaded portion 104). Second thread engagement clips 110 may be spaced apart, such as substantially equidistantly, about second inner surface 84 of second neck 78. Second thread engagement clips 110 may be positioned adjacent second neck end region 81, as indicated in FIG. 5. Each second thread engagement clip 110 may be a partial thread in some examples.

Second neck 78 of second insert part 54 may include one or more longitudinally-extending slots 112 in some examples. In some examples, longitudinally-extending slots 112 may extend through the entire thickness of second neck 78 (e.g., from second inner surface 84 to a second outer surface 100). In some examples, longitudinally-extending slots 112 may extend through just a portion of the thickness of second neck 78. For example, longitudinally-extending slots 112 may be formed in second inner surface 84 of second neck 78. In some examples, longitudinally-extending slots 112 may extend longitudinally from second neck end region 81 of second neck 78 towards second flange 72, along at least a portion of the length of second neck 78. In some examples, longitudinally-extending slots 112 may extend longitudinally from second neck end region 81 of second neck 78 to adjacent second flange 72. In some examples, two longitudinally-extending slots 112 may be formed, but other examples may include more or fewer longitudinally-extending slots 112.

Longitudinally-extending slots 112 may be configured to allow radial expansion of at least a portion of second neck 78. For example, longitudinally-extending slots 112 may be spaced relative to one another so as to form one or more pairs of longitudinally-extending slots 112, such that a radially-expandable tab 114 is formed between each respective adjacent pair of longitudinally-extending slots 112. Each radially-expandable tab 114 may include a respective second thread engagement clip 110 positioned on the respective portion of second inner surface 84 of second neck 78 corresponding to each radially-expandable tab 114. In these examples, second insert part 54 may be configured to be operatively positioned with respect to first insert part 52 by radially expanding each of the one or more radially-expandable tabs 114 such that second thread engagement clips 110 are longitudinally passed over one or more threads of first threaded portion 104 of first insert part 52, when second insert part 54 is longitudinally moved with respect to first insert part 52. Thus, second insert part 54 may be configured to be longitudinally moved with respect to first insert part 52 by radially expanding radially-expandable tabs 114 and ratcheting second thread engagement clips 110 along first threaded portion 104. Second engagement clips 110 may be configured to grip first threaded portion 104 of first insert part 52 when second insert part 54 is operatively positioned with respect to first insert part 52.

In some examples, longitudinally-extending slots 112 may be formed in second threaded portion 106 of second inner surface 84 of second neck 78, such that second threaded portion 106 may be discontinuous at each of the longitudinally-extending slots 112. Each longitudinally-extending slot 112 may be configured to receive a respective first thread engagement clip 108 positioned on first outer surface 90 of first neck 64 of first insert part 52, such that each first thread engagement clip 108 may be configured to slide longitudinally along a respective longitudinally-extending slot 112 when second insert part 54 is operatively positioned with respect to first insert part 52.

In some threaded adjustable-height inserts 50, first neck 64 of first insert part 52 may include one or more longitudinally-extending channels 116. Longitudinally-extending channels 116 may extend from first neck end region 67 of first neck 64 of first insert part 52 towards first flange 58 of first insert part 52. Longitudinally-extending channels 116 may be formed radially outward from first inner surface 68 of first neck 64 of first insert part 52 and may be spaced apart from one another, substantially equidistantly, about first inner surface 68 of first neck 64. In some examples, two longitudinally-extending channels 116 may be formed, but other examples may include more or fewer longitudinally-extending channels 116. Longitudinally-extending channels 116 may be staggered with respect to one or more first thread engagement clips 108 positioned on first outer surface 90 of first neck 64. Such longitudinally-extending channels 116 may be configured to engage a tool that is configured to substantially prevent rotation of first insert part 52 as second insert part 54 is rotated with respect to first insert part 52, when second insert part 54 is operatively positioned with respect to first insert part 52. For example, longitudinally-extending channels 116 may be accessible via second hole 80 of second insert part 54 and first hole 66 of first insert part 52 when second insert part 54 is operatively positioned with respect to first insert part 52, such that the tool may be inserted into second hole 80 and first hole 66 and such that the tool may engage longitudinally-extending channels 116 and thereby resist rotation of first insert part 52 with respect to bore 20 as second insert part 54 is rotated with respect to bore 20.

Threaded adjustable-height insert 50 may be adjustable without requiring access to both sides of the insert (e.g., height 56 of threaded adjustable-height insert 50 may be adjustable from just one side of sandwich panel 12, such as adjacent first skin 16 and second flange 72, without requiring access to second skin 18 or first flange 58). This may be advantageous in applications where only one side of sandwich panel 12 is accessible and/or when the correct insert size is difficult to ascertain.

Overall height 56 of threaded adjustable-height insert 50 may be selectively adjusted by longitudinally translating second insert part 54 with respect to first insert part 52 along arrow 93, and/or by rotating second insert part 54 with respect to first insert part 52. Threaded adjustable-height insert 50 may be configured such that overall height 56 may be adjustable until second upper surface 74 of second flange 72 is at least substantially flush with either first skin 16 or second skin 18 of sandwich panel 12, when second insert part 54 is operatively positioned with respect to first insert part 52 and threaded adjustable-height insert 50 is installed in bore 20 of sandwich panel 12. As used herein, a surface is "substantially flush" with another surface when the two surfaces are at least substantially level or in alignment with each other. For example, a flush installation of threaded adjustable-height insert 50 would be an installation where second upper surface 74 of second flange 72 (e.g., the outer surface of second flange 72) is at least substantially flush with (e.g., substantially level with) the outer surface of a skin of sandwich panel 12 when the insert is installed in the sandwich panel. For example, as shown in FIG. 5, threaded adjustable-height insert 50 is configured such that second upper surface 74 of second flange 72 is substantially flush with first skin 16 when threaded adjustable-height insert 50 is installed within bore 20 because second upper surface 74 of second flange 72 is substantially level with first outer panel surface 31 of first skin 16. The diameter of second flange 72 adjacent second upper surface 74 may be approximately equal to or slightly smaller than the diameter of the bore, to facilitate such flush installation.

Additionally, first lower surface 62 of first flange 58 may be substantially flush with second skin 18 when threaded adjustable-height insert 50 is installed within bore 20. In other words, first lower surface 62 of first flange 58 may be at least substantially level with second outer panel surface 35, as shown. In some examples, a majority of the adjustment of overall height 56 may be performed by longitudinally sliding second insert part 54 with respect to first insert part 52 (e.g., overall height 56 may be primarily (e.g., coarsely) adjusted by longitudinally sliding second insert part 54 with respect to first insert part 52). Rotation of second insert part 54 with respect to first insert part 52 may be configured for fine adjustment of overall height 56 of threaded adjustable-height insert 50. Threaded adjustable-height insert 50 may be configured to at least substantially maintain its overall height, once adjusted such that second upper surface 74 of second flange 72 is at least substantially flush with sandwich panel 12 (e.g., first outer panel surface 31) when second insert part 54 is operatively positioned with respect to first insert part 52 and threaded adjustable-height insert 50 is installed in bore 20.

In some examples, threaded adjustable-height insert 50 may include one or more anti-rotation features 96 that are configured to resist rotation of threaded adjustable-height insert 50 with respect to sandwich panel 12 once threaded adjustable-height insert 50 is fully inserted into sandwich panel 12. For example, anti-rotation feature 96 may include a textured surface that may engage with a potting compound or other adhesive injected into a space 98 within bore 20, space 98 being defined between bore 20 and threaded adjustable-height insert 50. For example, anti-rotation feature 96 may include a textured surface of second outer surface 100 of second neck 78 (e.g., second outer surface 100 of second neck 78 may be textured and/or have a textured coating deposited thereon or adhered thereto, which may function as anti-rotation feature 96). Some or all of second outer surface 100 of second neck 78 may be textured. In some examples, anti-rotation feature 96 may include textured surfaces on other portions of threaded adjustable-height insert 50, such as on first flange 58, first neck 64, and/or second flange 72. Anti-rotation feature 96 may include any structure or component of threaded adjustable-height insert 50 that is configured to resist rotation of threaded adjustable-height insert 50 with respect to sandwich panel 12, once threaded adjustable-height insert 50 is installed in bore 20.

In addition to or instead of second outer surface 100 being textured, anti-rotation feature 96 may include a plurality of radially-extending projections 94 extending from first flange 58, such as adjacent first lower surface 62 of first flange 58. For example, radially-extending projections 94 may be spaced apart about a peripheral edge region 95 of first flange 58 (e.g., radially-extending projections 94 may be spaced apart, about the circumference of first flange 58, adjacent first lower surface 62, in some examples). Threaded adjustable-height inserts 50 may include any suitable number of radially-extending projections 94, such as at least one, at least two, at least three, at least four, at least five, at least six, at least seven, at least eight, at least nine, at least 10, at least 12, at least 15, at least 20, at least 25, and/or at least 50 radially-extending projections 94. Radially-extending projections 94 may be localized extensions that radially extend farther from first hole 66 than the rest of first flange 58. Radially-extending projections 94 may be formed integrally with first flange 58, or may be secured or coupled to first flange 58. In some examples, radially-extending projections 94 may be formed of the same material as first flange 58. In other examples, radially-extending projections 94 may be formed of a different material than first flange 58. In some examples, each of the radially-extending projections 94 may extend from a circumferential surface 102 of first flange 58, and may be small-teeth-like projections designed to grip and engage core 14 and/or a skin of sandwich panel 12 (e.g., second skin 18 in FIG. 5), such that radially-extending projections 94 may be configured to resist rotation of first insert part 52 with respect to bore 20, as second insert part 54 is rotated with respect to first insert part 52.

In use, threaded adjustable-height insert 50 may be configured such that the overall height 56 of the insert is selectively adjustable once first insert part 52 and second insert part 54 are at least partially inserted into bore 20 of sandwich panel 12. For example, in the case of a blind bore, first insert part 52 may be placed into bore 20 of sandwich panel 12 and positioned within bore 20 such that first flange 58 is positioned adjacent a base of bore 20, such that first neck 64 extends away from the base and into bore 20 from within the bore. In the case of a through bore as shown in FIG. 5, first insert part 52 may be placed into bore 20 of sandwich panel 12 and positioned within bore 20 such that first flange 58 is positioned adjacent one of the panel skins (e.g., adjacent second skin 18) and such that first neck 64 extends away from the skin and into bore 20, towards the other panel skin (e.g., first neck 64 may extend away from second skin 18 and into bore 20, towards first skin 16, or vice versa).

Second insert part 54 may be operatively positioned with respect to first insert part 52. Such operative positioning of second insert part 54 with respect to first insert part 52 may be performed before or after first insert part 52 is positioned within bore 20. In some examples, second insert part 54 may be operatively positioned with respect to first insert part 52 such that second neck 78 is placed around first neck 64 (e.g., second inner surface 84 of second neck 78 may be positioned adjacent and engaged with first outer surface 90 of first neck 64). As shown in FIG. 5, second insert part 54 may be oriented such that second neck 78 is positioned between first flange 58 of first insert part 52 and second flange 72 of second insert part 54, and such that second neck 78 extends into bore 20, (e.g., towards a base of bore 20, and/or towards second skin 18, as shown in FIG. 5).

Height 56 of threaded adjustable-height insert may be adjustable between a maximum height and a minimum height. The difference between such maximum and minimum heights may be at least 0.05 inches (in) (1.27 millimeters (mm)), at least 0.10 in (2.54 mm), at least 0.15 in (3.81 mm), at least 0.20 in (5.08 mm), at least 0.30 in (7.62 mm), at least 0.40 in (10.16 mm), at least 0.5 in (12.7 mm), at least 0.6 in (15.24 mm), at least 0.7 in (17.78 mm), at least 0.8 in (20.32 mm), at least 0.9 in (22.86 mm), and/or at least 1.0 in (25.4 mm). In some examples, the difference between the minimum height and the maximum height is at least 10% of the maximum height, at least 15% of the maximum height, at least 20% of the maximum height, at least 25% of the maximum height, at least 30% of the maximum height, at least 35% of the maximum height, at least 40% of the maximum height, at least 45% of the maximum height, and/or at least 50% of the maximum height.

First insert part 52 and second insert part 54 may be made of any suitable material. In some examples, first insert part 52 and/or second insert part 54 may be polymeric. In some examples, first insert part 52 and/or second insert part 54 may be metallic. Advantageously, some examples of threaded adjustable-height inserts 50 may be configured to be installed in a sandwich panel 12 and adjusted for a flush installation, without requiring the use of tools.

Sandwich panel 12 may include a plurality of bores 20 spaced apart from each other. In some examples, at least one bore 20 may be formed through first skin 16 and at least a portion of core 14. Additionally or alternatively, at least one bore 20 may be formed through second skin 18 and at least a portion of core 14. In some examples, at least one bore 20 may be a blind bore, such that the bore does not extend all the way through sandwich panel 12 (e.g., bore 20 may be formed through first skin 16 and extend towards second skin 18, through a portion of core 14). Additionally or alternatively at least one bore 20 may be a through bore, extending through both first skin 16, second skin 18, and all the way through core 14. In some examples, a given sandwich panel 12 may include a plurality of bores 20 of different depths. Thus, a plurality of threaded adjustable-height inserts 50 may be provided, such that a different respective threaded adjustable-height insert 50 may be installed in each respective bore 20. Due to the adjustable nature of threaded adjustable-height inserts 50, the same size threaded adjustable-height insert 50 may be usable in a plurality of different bore depths and adjusted according to the height of the respective bore 20 in which the respective threaded adjustable-height insert 50 is placed. In some examples, a system may include a plurality of sizes of threaded adjustable-height inserts 50, where a relatively small number of sizes of threaded adjustable-height inserts 50 may replace a much larger number of sizes of conventional inserts.

One or more bores 20 may be at least substantially cylindrical in some examples (e.g., one or more bores 20 may have a substantially circular cross-sectional area). Additionally or alternatively, one or more bores 20 may have other cross-sectional areas, such as oval, elliptical, rectangular, triangular, polygonal, and/or irregularly shaped cross-sectional areas. An adhesive, such as potting compound, quick-cure compound, and/or UV-cure compound may be inserted (e.g., injected) between core 14 and threaded adjustable-height insert 50 (e.g., into space 98 between core 14 and threaded adjustable-height insert 50), once threaded adjustable-height insert 50 is positioned within bore 20. For example, a potting compound may be injected through one or more vents 118 (seen in FIG. 10), such that potting compound is inserted into space 98, adjacent second neck 78 of second insert part 54. Such potting compound may cure, thereby further securing threaded adjustable-height insert 50 in place within bore 20, such as by interacting with anti-rotation feature 96 in the form of a textured surface on second outer surface 100 of second neck 78.

Turning now to FIGS. 6-14, illustrative non-exclusive examples of threaded adjustable-height inserts 50 and components or portions thereof are illustrated. Where appropriate, the reference numerals from the schematic illustration of FIG. 5 are used to designate corresponding parts of the examples of FIGS. 6-14; however, the examples of FIGS. 6-14 are non-exclusive and do not limit threaded adjustable-height inserts to the illustrated embodiments of FIGS. 6-14. That is, threaded adjustable-height inserts 50 are not limited to the specific embodiments of FIGS. 6-14, and may incorporate any number of the various aspects, configurations, characteristics, properties, etc. of threaded adjustable-height inserts that are illustrated in and discussed with reference to the schematic representation of FIG. 5 and/or the embodiments of FIGS. 6-14, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the examples of FIGS. 6-14; however, it is within the scope of the present disclosure that the previously discussed features, variants, etc. may be utilized with the examples of FIGS. 6-14.

Figure 6:
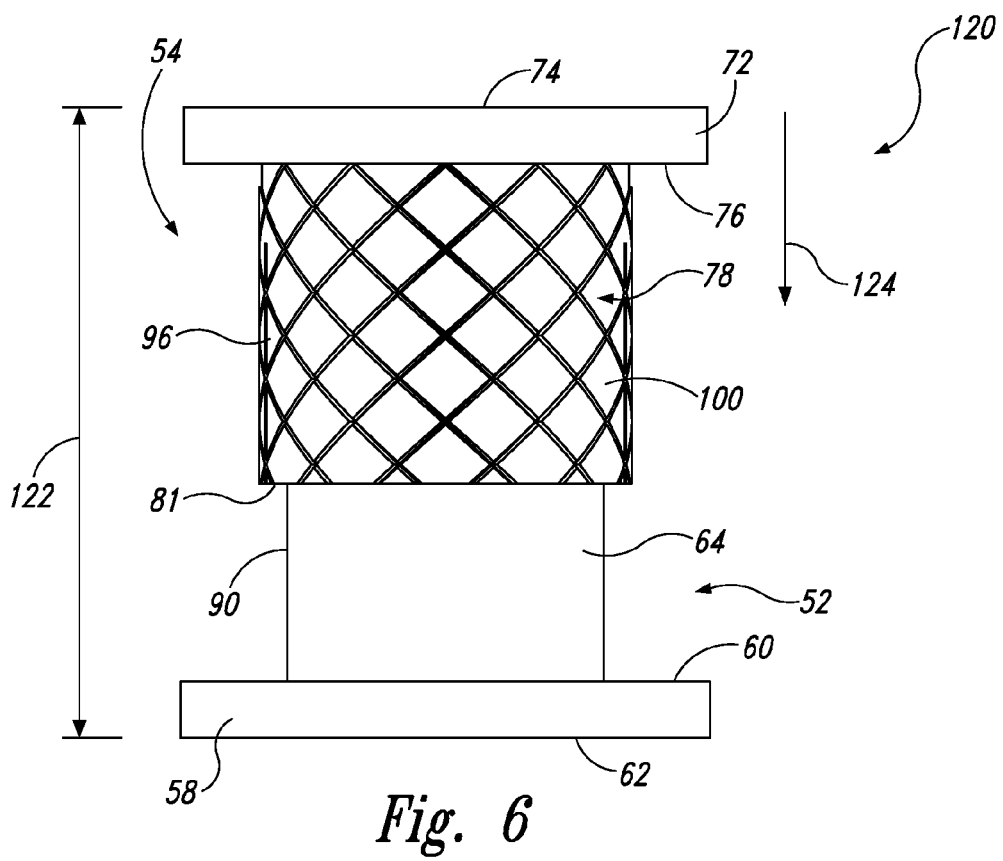
FIG. 6 is an elevation view of a threaded adjustable-height insert according to the present disclosure, in a configuration having a maximum overall height.
Figure 7:
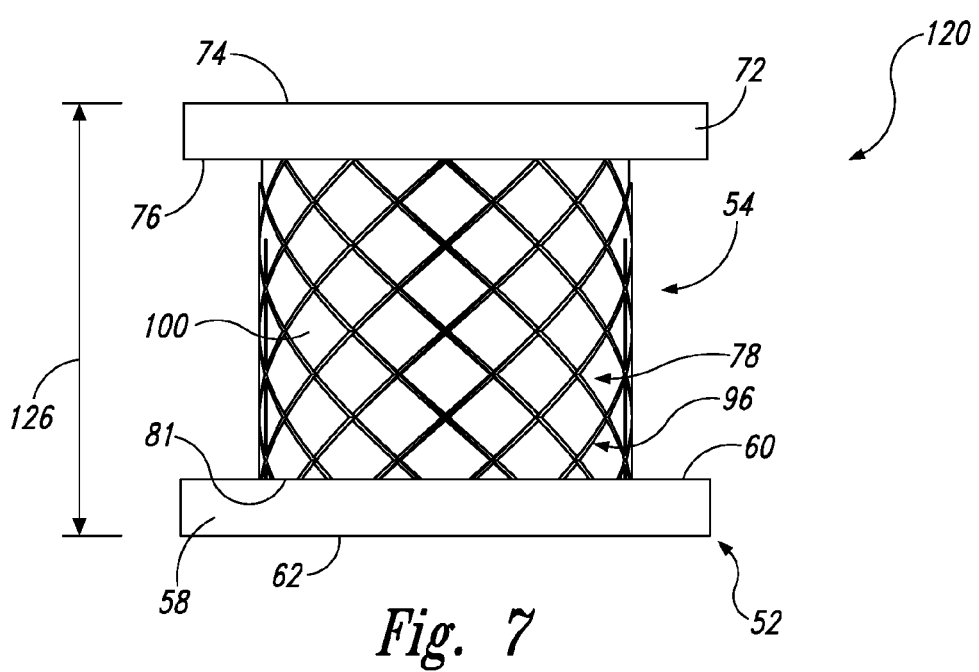
FIG. 7 is an elevation view of the threaded adjustable-height insert of FIG. 6, in a configuration having a minimum overall height.

FIGS. 6-7 illustrate a threaded adjustable-height insert 120, which is an example of threaded adjustable-height insert 50 of FIG. 5. FIG. 6 shows threaded adjustable-height insert 120 in a configuration having its maximum operative assembly height 122, which may be measured as the perpendicular distance between second upper surface 74 of second insert part 54 and first lower surface 62 of first insert part 52, when threaded adjustable-height insert 120 is assembled (e.g., when second insert part 54 is operatively positioned with respect to first insert part 52, as shown). The height of threaded adjustable-height insert 120 may be adjusted, such as by moving second insert part 54 with respect to first insert part 52. For example, second insert part 54 may be moved such that second flange 72 is moved towards first flange 58, thereby reducing the height of threaded adjustable-height insert 120. In some examples a force may be applied to second insert part 54, such as in the direction indicated by arrow 124, thereby moving second flange 72 of second insert part 54 towards first flange 58 of first insert part 52.

FIG. 7 shows threaded adjustable-height insert 120 in a configuration having its minimum operative assembly height 126 which may be measured as the perpendicular distance between second upper surface 74 of second insert part 54 and first lower surface 62 of first insert part 52, when threaded adjustable-height insert 120 is assembled and the overall height of threaded adjustable-height insert 120 has been reduced as much as possible (e.g., second insert part 54 has been moved toward first insert part 52, along arrow 124 of FIG. 6). Threaded adjustable-height insert 120 may be selectively adjustable to any height between maximum operative assembly height 122 of FIG. 6, and minimum operative assembly height 126 of FIG. 7, inclusive. In some examples, and as shown in FIG. 7, second neck end region 81 of second neck 78 may engage with, be in contact with, and/or be positioned adjacent to first flange 58, in such a minimum operative assembly height configuration. But in some embodiments, there may be a gap between second neck end region 81 and first flange 58, even in the minimum operative assembly height configuration.

Figure 8:
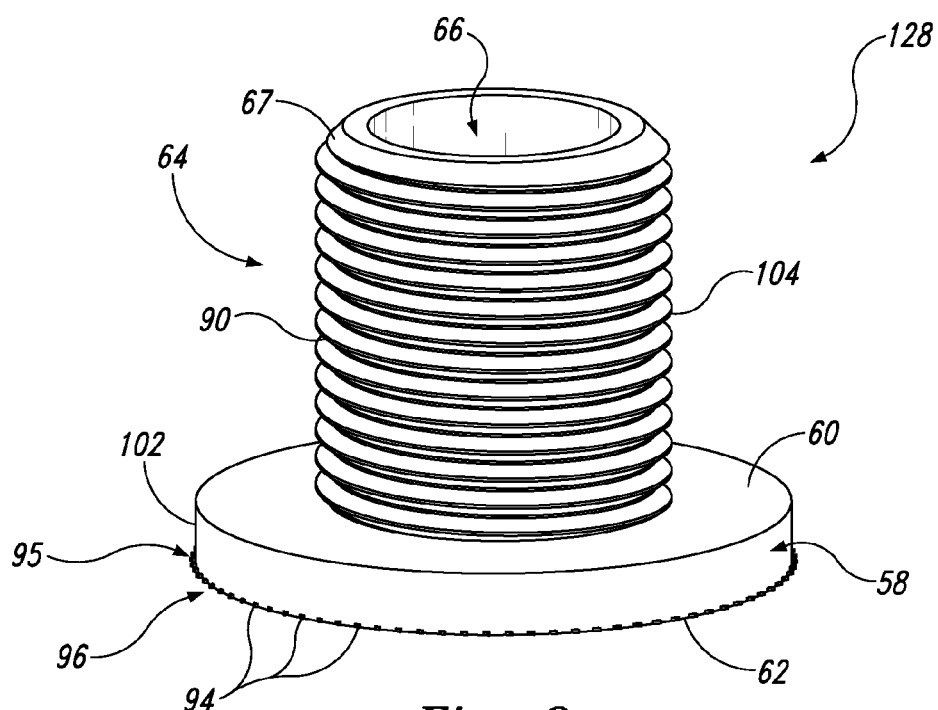
FIG. 8 is a perspective view of a first insert part of a threaded adjustable-height insert according to the present disclosure.
Figure 9:
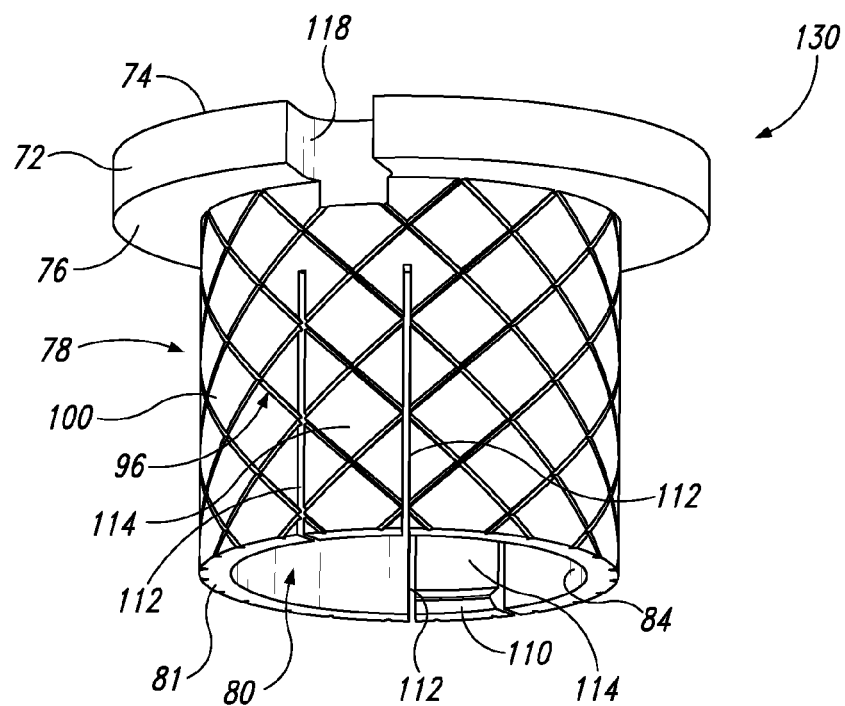
FIG. 9 is a perspective view of a second insert part of a threaded adjustable-height insert according to the present disclosure.
Figure 10:
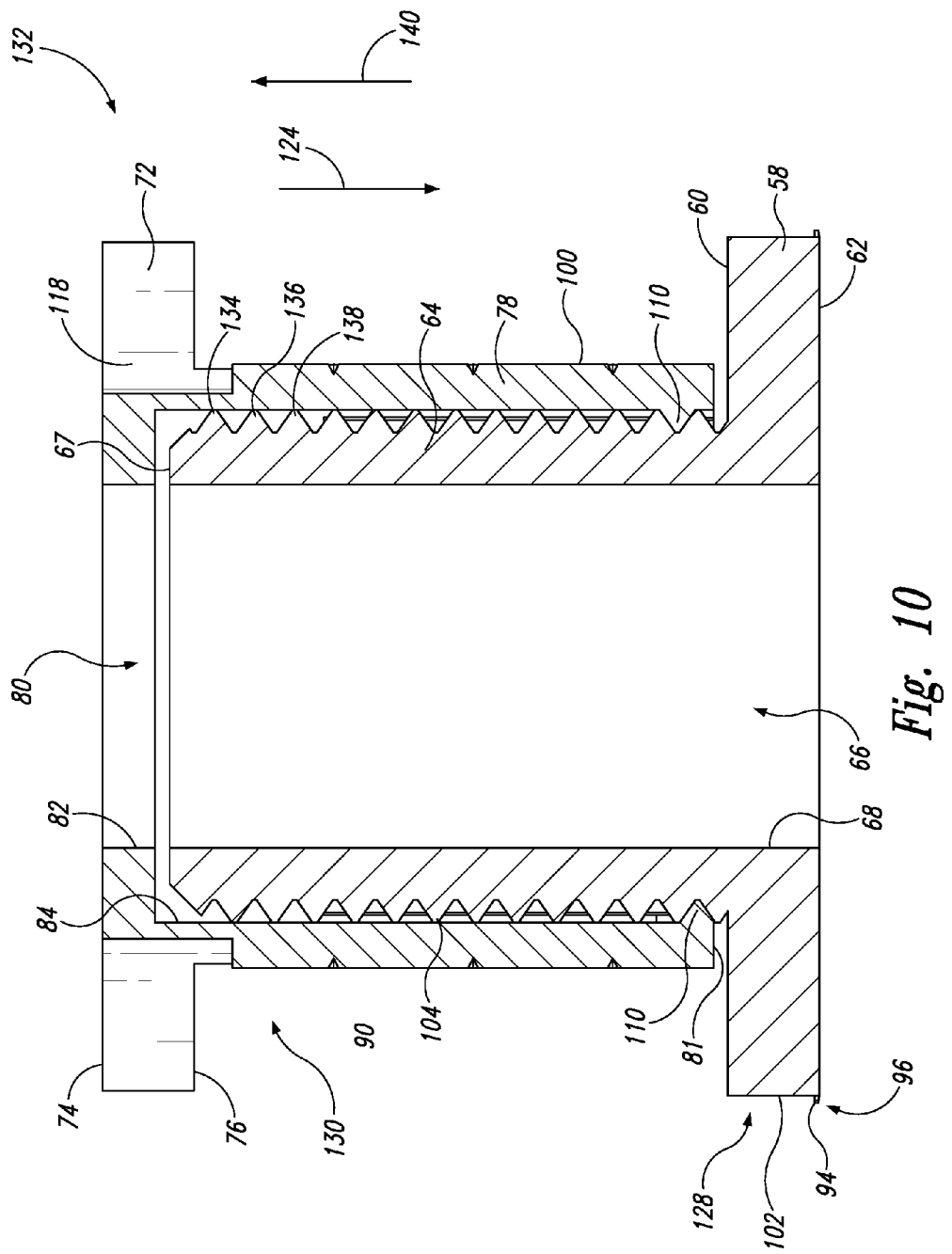
FIG. 10 is a cross-section view of the second insert part of FIG. 9 operatively positioned with respect to the first insert part of FIG. 8.

Now turning to FIGS. 8-10, FIG. 8 shows a first insert part 128 (which is an example of first insert part 52), FIG. 9 shows a second insert part 130 (which is an example of second insert part 54), and FIG. 10 illustrates a threaded adjustable-height insert 132 (which is an example of threaded adjustable-height insert 50), with second insert part 130 of FIG. 9 being operatively positioned with respect to first insert part 128 of FIG. 8, in cross-section. As shown in FIG. 10, first hole 66 and second hole 80 may be at least substantially concentric, so as to receive a secondary object (e.g., secondary object 92 of FIG. 5) therethrough. Second insert part 130 may be operatively positioned with respect to first insert part 128 such that a portion of second inner surface 84 of second neck 78 (e.g., second thread engagement clips 110 of second neck 78) is slidably engaged with a portion of first outer surface 90 of first neck 64 of first insert part 52. For example, second thread engagement clips 110 may be longitudinally slid, or ratcheted along, first threaded portion 104 of first neck 64, substantially along arrow 124, to reduce the overall height of threaded adjustable-height insert 132.

As second thread engagement clips 110 are passed over each successive thread (e.g., over a first thread 134, a second thread 136, a third thread 138, and so on), radially-expandable tabs 114 (FIG. 9) may radially expand slightly to allow second thread engagement clips 110 to pass over each respective thread. Once second thread engagement clips 110 are passed over a respective thread, radially-expandable tabs 114 may be configured to radially contract, thereby positioning second thread engagement clips 110 between a pair of adjacent threads, such that second thread engagement clips 110 grip first threaded portion 104. In this manner, first insert part 128 and second insert part 130 have a ratcheting relationship, such that threaded adjustable-height insert 132 is configured to maintain its overall height once adjusted (e.g., the engagement of second thread engagement clips 110 with first threaded portion 104 may be configured to resist increases to the overall height, or movement of second insert part 130 with respect to first insert part 128 in the direction of arrow 140.

Rotation of second insert part 130 with respect to first insert part 128 may cause second thread engagement clips 110 to travel radially along first threaded portion 104. In this manner, second insert part 130 may be threaded onto first insert part 128 by engaging second thread engagement clips 110 with first threaded portion 104 and rotating second insert part 130 with respect to first insert part 128. The overall height of threaded adjustable-height insert 132 may be increased (e.g., second flange 72 may be moved towards first flange 58 along arrow 124) by rotating second insert part 130 in one direction, and the overall height of threaded adjustable-height insert 132 may be decreased (e.g., second flange 72 may be moved away from first flange 58 along arrow 140) by rotating second insert part 130 in the opposite direction.

As shown in FIG. 9, second thread engagement clips 110 may be positioned between respective pairs of longitudinally-extending slots 112, such that when radially-expandable tabs 114 expand radially outward, so too do second thread engagement clips 110. Second insert part 130 includes two respective pairs of longitudinally-extending slots 112, thereby defining two radially-expandable tabs 114, each having a respective second thread engagement clip 110, however, more or fewer of each are possible in some examples. As shown in FIG. 9, longitudinally-extending slots 112 may extend through the entire thickness of second neck 78, from second inner surface 84 to second outer surface 100. Longitudinally-extending slots 112 extend from second neck end region 81 towards second flange 72, and second thread engagement clips 110 are positioned on the portion of second inner surface 84 of second neck 78 that corresponds to each radially-expandable tab 114.

Second outer surface 100 of second neck 78 may be textured so as to serve as an anti-rotation feature 96 when threaded adjustable-height insert 132 is installed within a sandwich panel and potting compound is inserted into the bore, but in some examples, second outer surface 100 may be substantially un-textured. Additionally or alternatively, as illustrated in FIGS. 8 and 10, first flange 58 of first insert part 128 may include a plurality of radially-extending projections 94 which may be configured to serve as an anti-rotation feature 96, such that first insert part 128 may be configured to resist rotation with respect to a bore in which it is installed, as second insert part 130 is rotated with respect to first insert part 128. Radially-extending projections 94 are shown positioned adjacent peripheral edge region 95 of first flange 58, but may be positioned anywhere on circumferential surface 102 of first flange 58. Radially-extending projections 94 may be bigger or smaller, greater or fewer in number, and/or differently shaped than the example shown.

Figure 11:
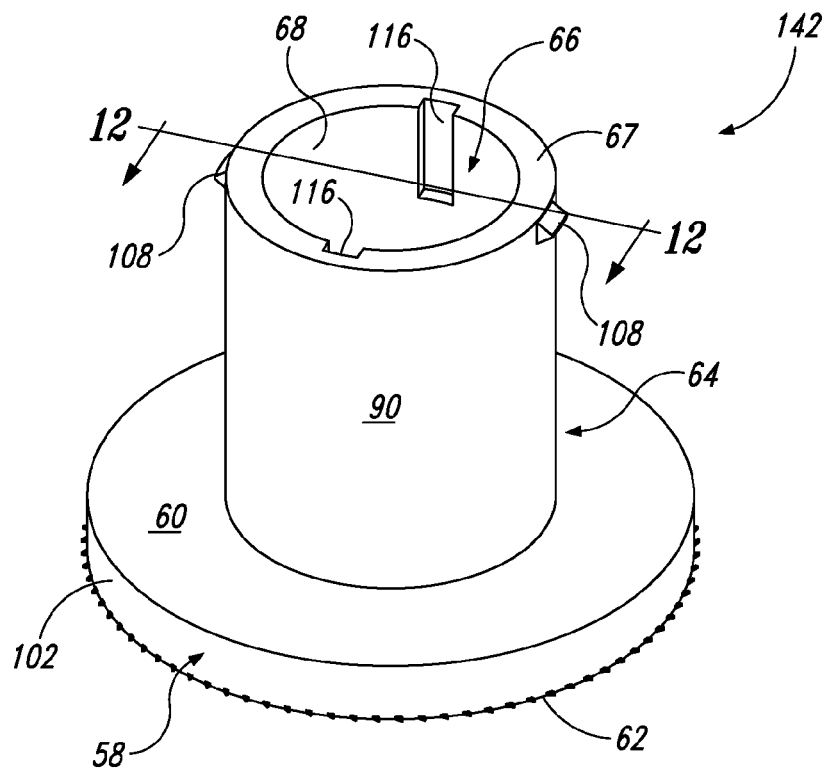
FIG. 11 is a perspective view of another example of a first insert part of a threaded adjustable-height insert according to the present disclosure.
Figure 12:
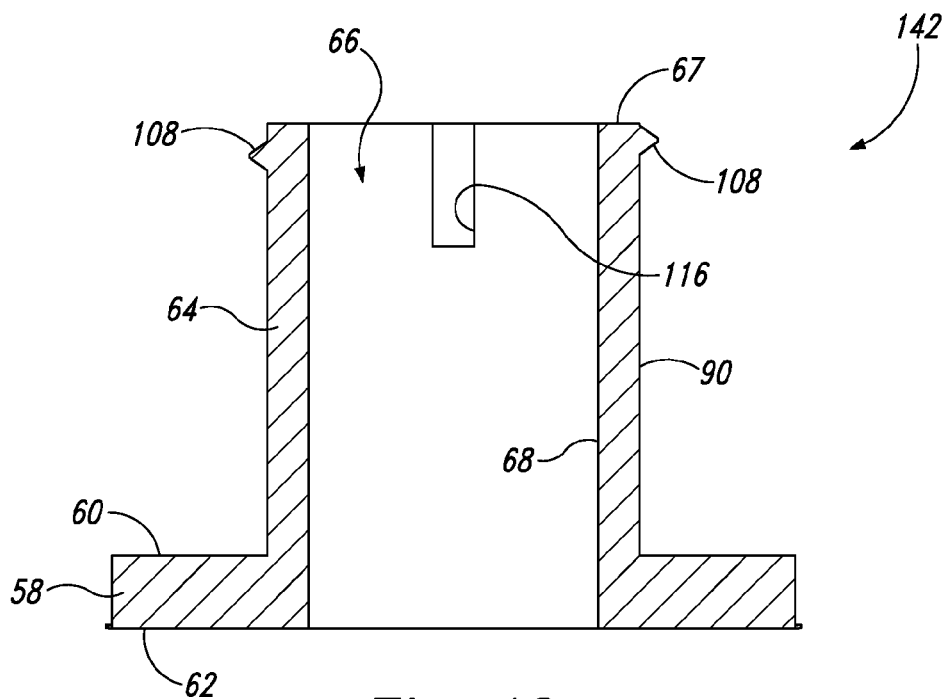
FIG. 12 is a cross-section view of the first insert part of FIG. 11, taken along line 12-12 of FIG. 11.
Figure 13:
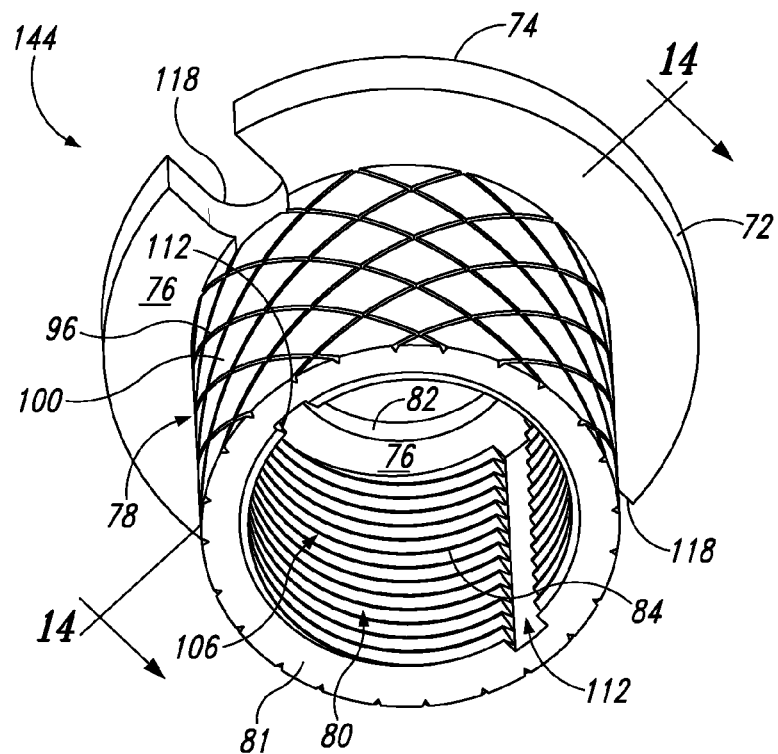
FIG. 13 is a perspective view of another example of a second insert part of a threaded adjustable-height insert according to the present disclosure.
Figure 14:
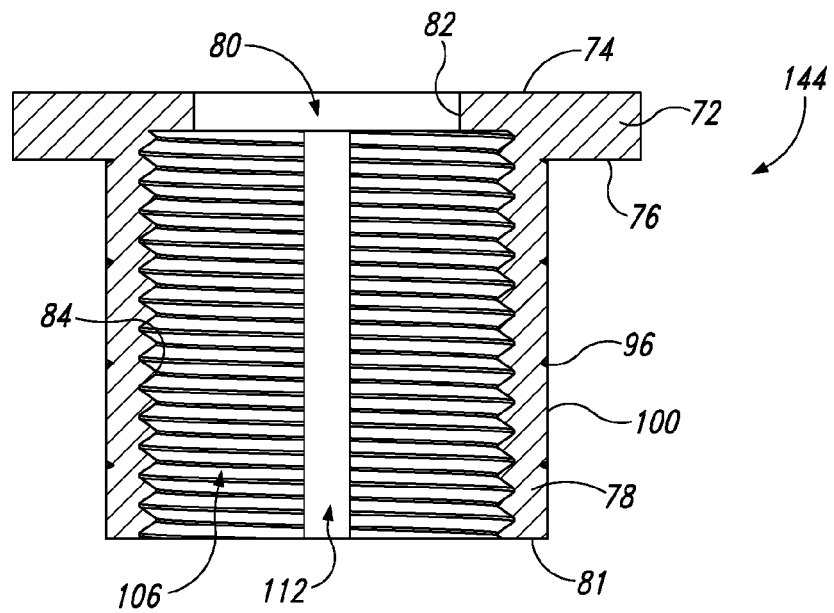
FIG. 14 is a cross-section view of the second insert part of FIG. 13, taken along line 14-14 of FIG. 13.

FIGS. 11-14 illustrate components of an example of threaded adjustable-height insert 50 having first insert part 142 (FIGS. 11-12) and second insert part 144 (FIGS. 13-14). First insert part 142 is an example of first insert part 52 and second insert part 144 is an example of second insert part 54. Second insert part 144 may be operatively positioned with respect to first insert part 142 to form a threaded adjustable-height insert as will be described.

FIG. 11 illustrates first insert part 142 in perspective view, and FIG. 12 shows first insert part 142 in cross-section. As shown in FIGS. 11-12, first insert part 142 includes two first thread engagement clips 108 positioned to extend radially outward from first outer surface 90 of first neck 64. The example shown in FIGS. 11-12 includes two first thread engagement clips 108, but more or fewer are possible in other examples. First thread engagement clips 108 may be spaced substantially equidistantly from each other, as shown. First thread engagement clips 108 are positioned near first neck end region 67, and may be configured to engage with second threaded portion 106 of second insert part 144 of FIGS. 13-14.

First insert part 142 also includes two longitudinally-extending channels 116 formed in first inner surface 68 of first neck 64, and that extend radially partially through the thickness of first neck 64. Longitudinally-extending channels 116 may extend longitudinally from first neck end region 67 towards first flange 58, but may not extend along the entire length of first neck 64 in some examples, as shown in FIG. 12. Longitudinally-extending channels 116 may be accessible via first hole 66, such that a tool may be inserted through first hole 66 and engaged with longitudinally-extending channels 116 in order to resist rotation of first insert part 142 as second insert part 144 is rotated with respect to first insert part 142. First insert part 142 includes two such longitudinally-extending channels 116, but more or fewer are possible in other examples. Longitudinally-extending channels 116 may be spaced substantially equidistantly from each other, as shown. Additionally, longitudinally-extending channels 116 may be staggered with respect to first thread engagement clips 108 as shown (e.g., first thread engagement clips 108 may alternate with longitudinally-extending channels 116 and be equidistantly spaced about the circumference of first neck end region 67).

Second insert part 144 of FIGS. 13-14 includes second threaded portion 106 in the form of internal threads formed within second inner surface 84 of second neck 78. Two vents 118 are shown formed in second flange 72, which may be configured for potting compound to be injected therethrough once second insert part 144 is installed within a bore of a sandwich panel. Second outer surface 100 of second neck 78 may be textured to form an anti-rotation feature 96, such that the textured surface resists rotation of second insert part 144 with respect to the bore when potting compound is injected alongside the textured surface and engages with the surface and hardens. As best seen in FIG. 14, second threaded portion 106 may extend along substantially the entire length of second neck 78, from second neck end region 81 to second lower surface 76 of second flange 72.

Second threaded portion 106 may be discontinuous at one or more locations, such as at longitudinally-extending slots 112 formed in second threaded portion 106. As seen in FIG. 14, longitudinally-extending slots 112 may extend substantially along the entire length of second neck 78, from second neck end region 81 to second lower surface 76 of second flange 72. In other examples, longitudinally-extending slots 112 may extend only along a portion of the length of second neck 78. As shown in FIG. 13, longitudinally-extending slots 112 may be formed through only a portion of the thickness of second neck 78.

Longitudinally-extending slots 112 of second insert part 144 may be configured to receive first thread engagement clips 108 of first insert part 142 of FIGS. 11-12. For example, second insert part 144 may be operatively positioned with respect to first insert part 142 such that longitudinally-extending slots 112 are aligned with first thread engagement clips 108. As second insert part 144 is positioned such that second inner surface 84 of second neck 78 is adjacent first outer surface 90 of first neck 64 of first insert part 142, first thread engagement clips 108 may be positioned within longitudinally-extending slots 112. As so arranged, first thread engagement clips 108 may longitudinally slide along longitudinally-extending slots 112 such that second insert part 144 may be slidably longitudinally translated with respect to first insert part 142. As longitudinally-extending slots 112 are slid along first thread engagement clips 108, second flange 72 may be moved towards first flange 58 such that the overall height of the threaded adjustable-height insert (e.g., the combination of first insert part 142 and second insert part 144) may be adjusted.

First thread engagement clips 108 also may be configured to engage with second threaded portion 106 such that second insert part 144 may be radially moved (e.g., rotated) with respect to first insert part 142. As second insert part 144 is rotated with respect to first insert part 142, first thread engagement clips 108, which may be partial external threads, may engage with second threaded portion 106 and first thread engagement clips 108 may travel along the threads of second threaded portion 106 as second insert part 144 is rotated. As mentioned above, a tool may be used to resist rotation of first insert part 142 with respect to the bore in which the parts are inserted, while second insert part 144 is rotated with respect to first insert part 142. Such tool may be inserted through second hole 80 of second insert part 144 and into first hole 66 of first insert part 142.

Figure 15:
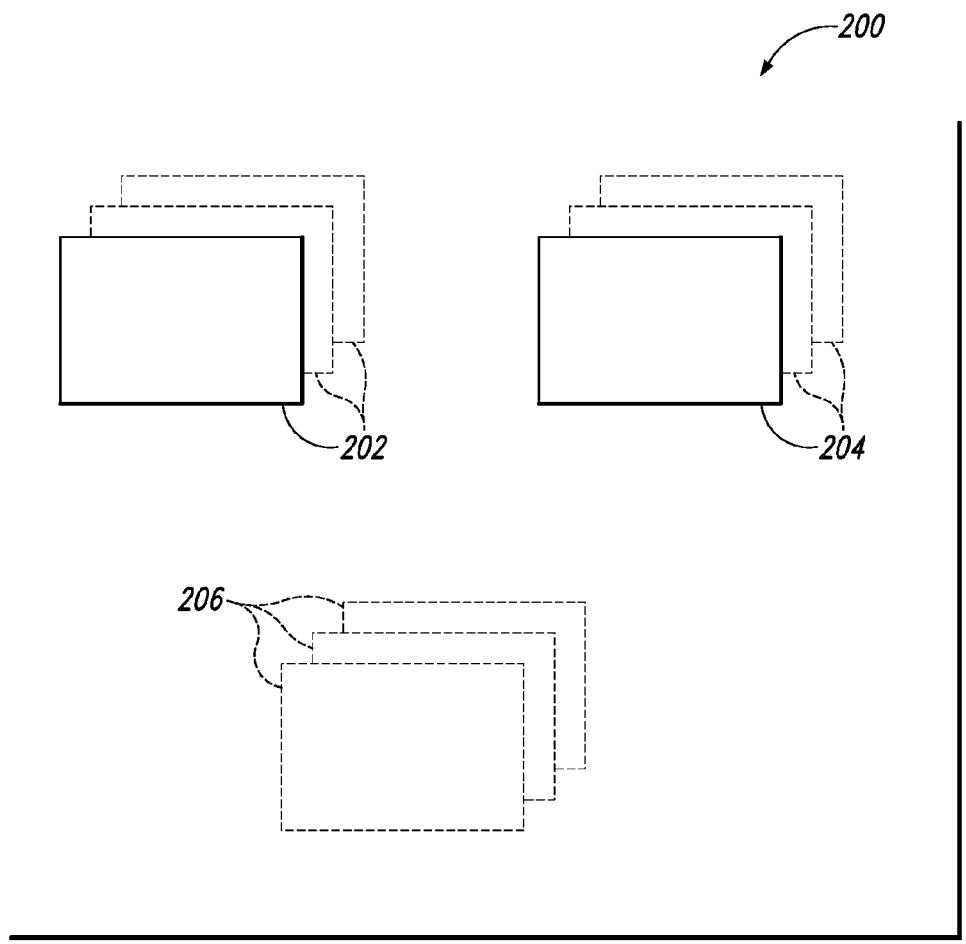
FIG. 15 a schematic view of illustrative, non-exclusive examples of systems of threaded adjustable-height inserts according to the present disclosure.

FIG. 15 illustrates a schematic view of systems 200 of a plurality of threaded adjustable-height inserts according to the present disclosure. For example, systems 200 may include one or more first threaded adjustable-height inserts 202 (which are an example of threaded adjustable-height insert 50), and one or more second threaded adjustable-height inserts 204 (which are an example of threaded adjustable-height insert 50). Each first threaded adjustable-height insert 202 may be adjustable between a first maximum overall height and a first minimum overall height, when the respective second insert part is operatively positioned with respect to the respective first insert part of first threaded adjustable-height insert 202. Similarly, each second threaded adjustable-height insert 204 may be adjustable between a second maximum overall height and a second minimum overall height when the respective second insert part is operatively positioned with respect to the respective first insert part of the second threaded adjustable-height insert 204.

The first minimum overall height and the second minimum overall height may be different from each other. For example, second threaded adjustable-height insert 204 may be a "bigger" size than first threaded adjustable-height insert 202 within system 200, such that the second minimum overall height may be greater than the first minimum overall height. In some examples, there may be some overlap between respective sizes of inserts, such that, for example, the second minimum overall height may be a height in between the first minimum overall height and the first maximum overall height. Similarly, the second maximum overall height may be greater than the first maximum overall height, such that a respective second threaded adjustable-height insert 204 may be adjustable to have a flush installation with a deeper bore than a respective first threaded adjustable-height insert 202. In some systems 200, different sizes of threaded adjustable-height inserts may additionally or alternatively have different flange diameters, such that they may be configured for use with different diameter bores.

Each respective size of inserts within a given system 200 may have an adjustment range, defined as the difference between the minimum overall height and maximum overall height of the threaded adjustable-height insert. For example, first threaded adjustable-height inserts 202 may have a first adjustment range equal to the difference between the first maximum overall height and the first minimum overall height. Similarly, second threaded adjustable-height inserts 204 may have a second adjustment range equal to the difference between the second maximum overall height and the second minimum overall height. In some examples, the second adjustment range may be greater than the first adjustment range.

Systems 200 may include one or more third threaded adjustable-height inserts 206 (which are an example of threaded adjustable-height insert 50), having a third minimum overall height and a third maximum overall height when the respective second insert part is operatively positioned with respect to the respective first inserts part of third threaded adjustable-height insert 206. The third minimum overall height may be different from the first minimum overall height of first threaded adjustable-height inserts 202 and/or different from the second minimum overall height of second threaded adjustable-height inserts 204. Additionally or alternatively, the third maximum overall height may be different from the first maximum overall height of first threaded adjustable-height inserts 202 and/or different from the second maximum overall height of second threaded adjustable-height inserts 204. In some examples, the third minimum overall height may be greater than the first minimum overall height, greater than the second minimum overall height, and/or less than the second maximum overall height. Additionally or alternatively, the third maximum overall height may be greater than the second maximum overall height and the first maximum overall height.

Systems 200 may include any number of inserts and any number of sizes of inserts. Generally, however, systems 200 may include a smaller number of sizes of threaded adjustable-height inserts than would be required using conventional inserts for the same collection of respective bores. For example, if a given sandwich panel includes bores of ten different sizes requiring ten different sizes of conventional inserts, presently disclosed threaded adjustable-height inserts may be suitable for those ten different bores using just one or two sizes of threaded adjustable-height inserts according to the present disclosure. This ratio of the number of required sizes is provided for example purposes only, and is not limiting in any way.

Figure 16:
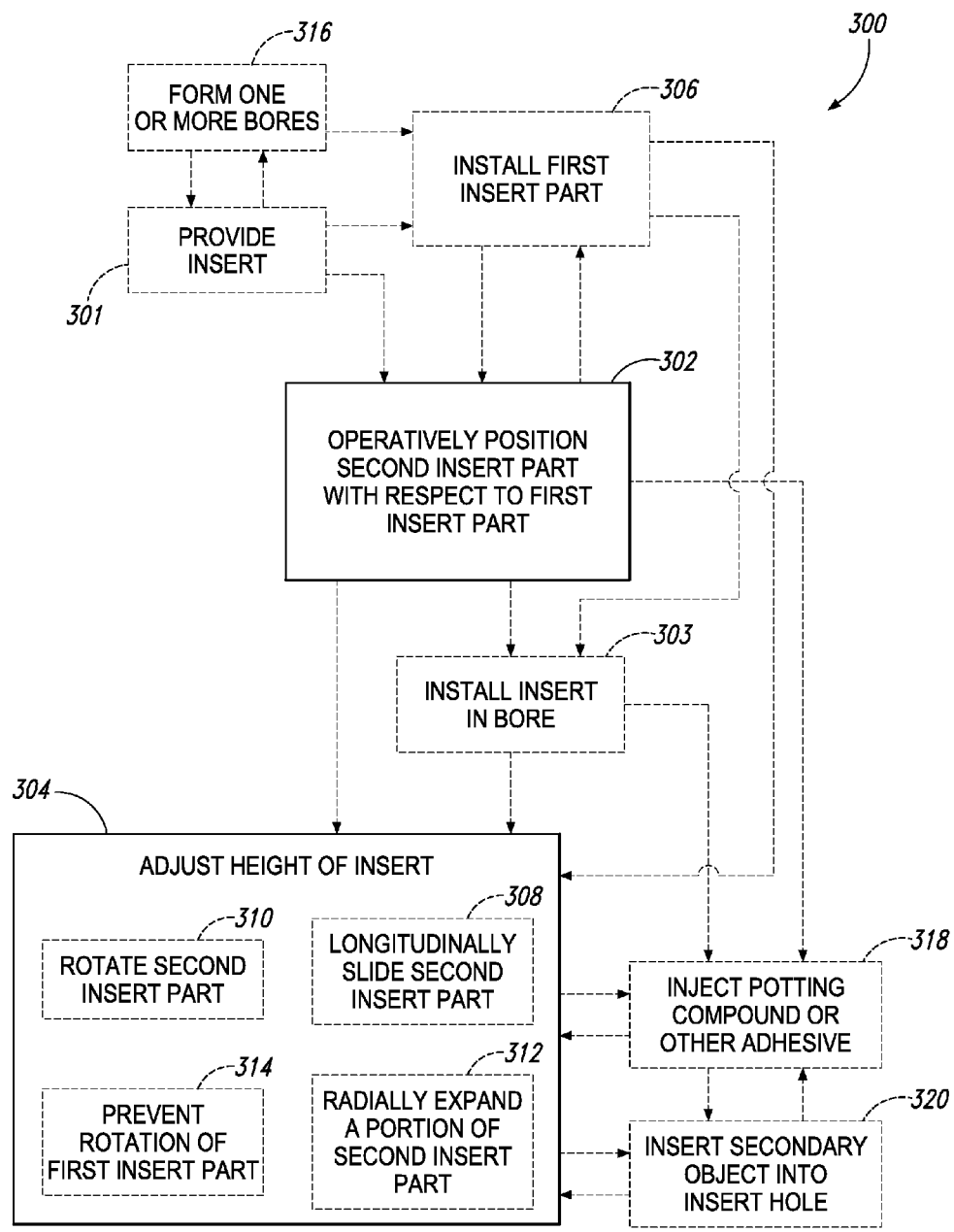
FIG. 16 is a schematic flow chart diagram, representing methods of installing and adjusting the height of one or more threaded adjustable-height inserts, according to the present disclosure.

FIG. 16 schematically provides a flowchart that represents illustrative, non-exclusive examples of methods 300 according to the present disclosure. In FIG. 16, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 16 are not limiting and other methods and steps are within the scope of the present disclosure, including methods having greater than or fewer than the number of steps illustrated, as understood from the discussions herein.

As shown in FIG. 16, methods 300 according to the present disclosure may generally include providing a threaded adjustable-height insert (e.g., threaded adjustable-height insert 50) at 301, installing the threaded adjustable-height insert into a sandwich panel (e.g., into bore 20 of sandwich panel 12) at 303, such as by operatively positioning a second insert part (e.g., second insert part 54) with respect to a first insert part (e.g., first insert part 52) at 302, and/or adjusting the height of the threaded adjustable-height insert at 304. In some methods 300, installing the threaded adjustable-height insert at 303 may include installing a plurality of respective threaded adjustable-height inserts into a plurality of respective bores formed in one or more sandwich panels. Some methods may include installing a respective first insert part in a respective bore at 306 such that at least a portion of a first neck (e.g., first neck 64) of the first insert part is positioned within the bore. Such installing the first insert part at 306 may be performed before or after operatively positioning the second insert part with respect to the first insert part at 302. In some methods, operatively positioning the second insert part at 302 may include installing the second insert part in the respective bore such that at least a portion of a second neck (e.g., second neck 78) of the second insert part is positioned within the bore.

In some methods, installing the first insert part in the bore at 306 may be performed prior to operatively positioning the second insert part with respect to the first insert part at 302 (e.g., the first insert part may be positioned within the bore and then the second insert part may be positioned within the bore). For example, installing the first insert part at 306 may include positioning the first insert part within the bore such that a first flange (e.g., first flange 58) of the first insert part is positioned adjacent a skin of the sandwich panel (e.g., first skin 16 or second skin 18), such that the first neck extends into the bore from within the bore, away from the respective panel skin. Once the first insert part is so positioned at 306, in some methods, the second insert part may be operatively positioned at 302 such that the second neck is positioned between the first flange of the first insert part and a second flange (e.g. second flange 72) of the second insert part (e.g., the second neck may extend into the bore, towards the base of the bore and/or towards the respective panel skin).

In some methods, installing the first insert part in the bore at 306 may be performed after operatively positioning the second insert part with respect to the first insert part at 302 (e.g., the second part may be operatively positioned at 302, such as positioned at least partially onto the first insert part, and then the assembly of the first insert part and the second insert part may together be installed into the bore of the sandwich panel at 303). In some methods, operatively positioning the second insert part with respect to the first insert part at 302 may include positioning the second insert part such that a second hole (e.g., second hole 80) of the second insert part is at least substantially concentric with a first hole (e.g., first hole 66) of the first insert part.

Adjusting the height of the threaded adjustable-height insert at 304 may include adjusting the height until a second upper surface of the second flange (e.g., second upper surface 74 of second flange 72) of the second insert part is at least substantially flush with an outer surface of the sandwich panel (e.g., first outer panel surface 31 or second outer panel surface 35). Adjusting the height of the threaded adjustable-height insert at 304 may include pressing the second flange of the second insert part towards the first flange of the first insert part. For example, a force may be applied to the second insert part (e.g., to a second upper surface, such as second upper surface 74, of the second flange of the second insert part) such that the second insert part is moved (e.g., longitudinally translated and/or rotated) with respect to the first insert part, and the second flange moves towards the first flange, thereby reducing an overall height of the threaded adjustable-height insert. In some methods 300, pressing the second flange of the second insert part towards the first flange of the first insert part may include moving the second neck of the second insert part with respect to and towards the first flange of the first insert part.

In some methods 300, adjusting the height of the threaded adjustable-height insert at 304 may include longitudinally sliding the second insert part with respect to the first insert part at 308, rotating the second insert part with respect to the first insert part at 310, radially expanding a portion of the second insert part at 312, and/or preventing rotation of the first insert part with respect to the bore at 314. For example, longitudinally sliding the second insert part with respect to the first insert part at 308 may include positioning the respective parts such that first thread engagement clips (e.g., first thread engagement clips 108) of the first insert part are slid within longitudinally-extending slots (e.g., longitudinally-extending slots 112) of the second insert part. In other examples, longitudinally sliding the second insert part with respect to the first insert part at 308 may include ratcheting second thread engagement clips (e.g., second thread engagement clips 110) of the second insert part along and over respective threads of a first threaded portion (e.g., first threaded portion 104) of the first insert part. Radially expanding a portion of the second insert part at 312 may include forcing a portion of the second insert part, such as one or more radially-expandable tabs (e.g., radially-expandable tabs 114), to temporarily expand each time a second thread engagement clip 110 is passed over a respective thread of the first threaded portion, thereby allowing the second insert part to be longitudinally translated with respect to the first insert part.

Rotating the second insert part with respect to the first insert part at 310 may include engaging first thread engagement clips with a second threaded portion (e.g., second threaded portion 106) of the second insert part, such that as the second insert part is rotated, the first thread engagement clips travel along the second threaded portion, thereby resulting in a threaded engagement between the first insert part and the second insert part. Alternatively, rotating the second insert part with respect to the first insert part at 310 may include engaging second thread engagement clips of the second insert part with the first threaded portion of the first insert part, such that as the second insert part is rotated, the second thread engagement clips travel along the first threaded portion, thereby resulting in a threaded engagement between the first insert part and the second insert part. In some such methods 300, preventing rotation of the first insert part with respect to the bore while the second insert part is rotated with respect to the first part at 314 may include inserting a tool into a second hole (e.g., second hole 80) and a first hole (e.g., first hole 66) of the threaded adjustable-height insert (wherein said first hole and second hole may be substantially concentric when the second insert part is operatively positioned with respect to the first insert part). Said tool may engage longitudinally-extending channels (e.g., longitudinally-extending channels 116) formed in the inner surface of the first insert part (e.g., first inner surface 68 of first neck 64 of first insert part 52) to substantially prevent rotation of the first insert part with respect to the bore.

Some methods 300 may include forming at least one bore in a sandwich panel at 316. Forming a bore at 316 may include forming a plurality of bores in a given sandwich panel. Forming a bore at 316 may include forming a bore that extends through one or both of a first skin (e.g. first skin 16) and a second skin (e.g. second skin 18) of the sandwich panel, as well as through at least a portion of a core (e.g. core 14) of the sandwich panel. In some methods 300, forming at least one bore at 316 may be automated. Forming at least one bore at 316 may include forming at least one blind bore (e.g., a bore that extends through only one skin and only partially through the core of the sandwich panel) and/or may include forming at least one through bore (e.g., a bore that extends through both skins and through the entire core of the sandwich panel). Forming at least one bore at 316 may include drilling, milling, and/or punching in some methods 300. In some methods 300, forming at least one bore at 316 may include forming at least one bore having a circular cross-sectional area. Additionally or alternatively, forming at least one bore at 316 may include forming at least one bore having a non-circular cross-sectional area, such as at least one bore having a polygonal, elliptical, and/or irregularly-shaped cross-sectional area.

Methods 300 may include injecting a potting compound or other adhesive at 318 into a space (e.g., space 98) between the bore and the threaded adjustable-height insert. Injecting the potting compound at 318 may be performed after the threaded adjustable-height insert is positioned within the bore (e.g., after the second insert part is operatively positioned with respect to the first insert part) and after the height of the threaded adjustable-height insert has been adjusted. For example, potting compound may be injected through one or more vents (e.g., vents 118) formed in the second insert part, such that potting compound is placed within the bore, adjacent the second neck of the second insert part. Injecting potting compound at 318 may include injecting a potting compound, injecting a quick-cure adhesive, injecting a UV-cure adhesive, and/or injecting any other compound configured to increase security of the threaded adjustable-height insert within the bore. In some methods 300, injecting a potting compound at 318 may include injecting a potting compound such that it is adjacent an anti-rotation feature (e.g., anti-rotation feature 96) of the threaded adjustable-height insert, such as adjacent a textured outer surface of the second neck (e.g., second outer surface 100 of second neck 78).

Additionally or alternatively, methods 300 may include inserting a secondary object (e.g., secondary object 92) at 320 through the threaded adjustable-height insert (e.g., through the first hole and the second hole of the threaded adjustable-height insert). The secondary object may include a fastener, a bolt, a pin, a wire, and/or any object or structure that may be configured to transfer a localized load to the sandwich panel via the threaded adjustable-height insert.

Any number of threaded adjustable-height inserts may be installed in a given sandwich panel in methods 300 according to the present disclosure. In some methods 300, the threaded adjustable-height inserts may be configured for tool-less installations (e.g., the inserts may be installed at 303, their height adjusted at 304, and/or the second insert part may be operatively positioned at 302 without requiring the use of tools). In some methods, operatively positioning the second insert part at 302, installing the threaded adjustable-height insert at 303 and/or adjusting the height of the threaded adjustable-height insert at 304 may be automated. In some methods 300, at least one threaded adjustable-height insert may be installed adjacent one side of a sandwich panel (e.g., adjacent the first skin), and at least one threaded adjustable-height insert may be installed adjacent the opposite side of the sandwich panel (e.g., adjacent the second skin). In some methods 300, a plurality of threaded adjustable-height inserts may be installed via just one side of a sandwich panel, and the heights of the inserts may be adjusted without requiring access to the opposite side of the sandwich panel. In some methods 300, a plurality of sizes of threaded adjustable-height inserts may be installed such that they are flush within a larger plurality of sizes of bores (e.g., bores of varying depths).

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

Illustrative, non-exclusive examples of inventive subject matter according to the present disclosure are described in the following enumerated paragraphs:

A1. A threaded adjustable-height insert, comprising:
a first insert part, comprising:
a first flange having a first upper surface and a first lower surface;
a first neck extending from the first upper surface of the first flange to a first neck end region; and
a first hole extending at least through the first neck and defined at least partially by a first inner surface of the first neck, wherein the first neck comprises a first outer surface opposite the first inner surface; and
a second insert part, comprising:
a second flange having a second upper surface and a second lower surface;
a second neck extending from the second lower surface of the second flange to a second neck end region; and
a second hole extending through the second neck and the second flange, wherein the second hole is partially defined by a second inner surface of the second neck, and wherein the second neck comprises a second outer surface opposite the second inner surface;
wherein the second insert part is configured to be selectively operatively positioned with respect to the first insert part such that at least a portion of the second inner surface of the second neck has a threaded engagement with at least a portion of the first neck, wherein the threaded adjustable-height insert is configured to have a selectively adjustable overall height such that moving the second insert part with respect to the first insert part such that the second flange is moved towards the first flange reduces the overall height of the threaded adjustable-height insert, wherein the overall height of the threaded adjustable-height insert is defined as the perpendicular distance between the second upper surface of the second flange and the first lower surface of the first flange, and wherein the first hole and the second hole are at least substantially concentric when the second insert part is operatively positioned with respect to the first insert part.

A1.1. The threaded adjustable-height insert of paragraph A1, wherein at least a portion of the second inner surface of the second neck has a threaded engagement with at least a portion of the first outer surface of the first neck.

A2. The threaded adjustable-height insert of paragraph A1 or A1.1, wherein the threaded adjustable-height insert is configured to receive a secondary object within the first hole and the second hole, the secondary object being configured to transfer a localized load to a sandwich panel in which the threaded adjustable-height insert is installed, via the threaded adjustable-height insert.

A3. The threaded adjustable-height insert of any of paragraphs A1-A2, wherein the threaded adjustable-height insert is configured to be installed in a bore of a/the sandwich panel, the sandwich panel comprising a first skin, a second skin opposite the first skin, and a core therebetween.

A4. The threaded adjustable-height insert of any of paragraphs A1-A3, further comprising an anti-rotation feature configured to resist rotation of at least a portion of the threaded adjustable-height insert with respect to a/the sandwich panel once the adjustable-height insert is inserted in the sandwich panel and/or once a potting compound is injected into a/the bore of the sandwich panel adjacent the threaded adjustable-height insert.

A5. The threaded adjustable-height insert of paragraph A4, wherein the anti-rotation feature comprises a textured surface.

A6. The threaded adjustable-height insert of paragraph A5, wherein the second insert part includes the textured surface.

A7. The threaded adjustable-height insert of paragraph A6, wherein the textured surface forms at least a portion of the second neck of the second insert part.

A8. The threaded adjustable-height insert of any of paragraphs A4-A7, wherein the anti-rotation feature is configured to engage the potting compound injected into the bore of the sandwich panel in which the threaded adjustable-height insert is configured to be installed.

A9. The threaded adjustable-height insert of any of paragraphs A4-A8, wherein the anti-rotation feature is configured to engage a/the core of the sandwich panel.

A10. The threaded adjustable-height insert of any of paragraphs A4-A9, wherein the anti-rotation feature comprises a plurality of projections radially extending from a peripheral edge region of the first flange.

A10.1. The threaded adjustable-height insert of any of paragraphs A4-A9, wherein the anti-rotation feature is configured to resist rotation of the first insert part with respect to the sandwich panel, as the second insert part is rotated with respect to the first insert part.

A11. The threaded adjustable-height insert of any of paragraphs A1-A10.1, wherein the first hole extends through the first flange.

A12. The threaded adjustable-height insert of any of paragraphs A1-A11, wherein the threaded adjustable-height insert is configured such that the second upper surface of the second flange is at least substantially flush with one of a/the first skin and a/the second skin of a/the sandwich panel when the second insert part is operatively positioned with respect to the first insert part and the threaded adjustable-height insert is installed in a/the bore of the sandwich panel.

A13. The threaded adjustable-height insert of any of paragraphs A1-A12, wherein the threaded adjustable-height insert is configured to at least substantially maintain its overall height, once adjusted such that the second upper surface of the second flange is at least substantially flush with a/the sandwich panel when the second insert part is operatively positioned with respect to the first insert part and the threaded adjustable-height insert is installed in a/the bore of the sandwich panel.

A14. The threaded adjustable-height insert of any of paragraphs A1-A13, wherein the threaded adjustable-height insert is configured such that the overall height of the threaded adjustable-height insert is adjustable once the first insert part and the second insert part are at least partially inserted into a/the bore of a/the sandwich panel.

A15. The threaded adjustable-height insert of any of paragraphs A1-A14, wherein the first insert part and the second insert part are polymeric.

A16. The threaded adjustable-height insert of any of paragraphs A1-A15, wherein the threaded adjustable-height insert is configured such that the overall height is adjustable between a minimum height and a maximum height, and wherein the difference between the minimum height and the maximum height is at least 0.05 inches (in) (1.27 millimeters (mm)), at least 0.10 in (2.54 mm), at least 0.15 in (3.81 mm), at least 0.20 in (5.08 mm), at least 0.30 in (7.62 mm), at least 0.40 in (10.16 mm), at least 0.5 in (12.7 mm), at least 0.6 in (15.24 mm), at least 0.7 in (17.78 mm), at least 0.8 in (20.32 mm), at least 0.9 in (22.86 mm), and/or at least 1.0 in (25.4 mm).

A17. The threaded adjustable-height insert of any of paragraphs A1-A16, wherein the threaded adjustable-height insert is configured such that the overall height is adjustable between a/the minimum height and a/the maximum height, and wherein the difference between the minimum height and the maximum height is at least 10% of the maximum height, at least 15% of the maximum height, at least 20% of the maximum height, at least 25% of the maximum height, at least 30% of the maximum height, at least 35% of the maximum height, at least 40% of the maximum height, at least 45% of the maximum height, and/or at least 50% of the maximum height.

A18. The threaded adjustable-height insert of any of paragraphs A1-A17, wherein the threaded adjustable-height insert is configured such that the overall height is adjustable via applying a force to the second insert part, thereby moving the second flange towards the first flange.

A19. The threaded adjustable-height insert of any of paragraphs A1-A18, wherein the threaded adjustable-height insert is configured such that the overall height is adjustable via longitudinal movement of the second insert part with respect to the first insert part.

A20. The threaded adjustable-height insert of any of paragraphs A1-A19, wherein the threaded adjustable-height insert is configured such that the first insert part and the second insert part are slidably engaged with one another, and wherein the overall height is adjustable by longitudinally sliding the second insert part with respect to the first insert part.

A21. The threaded adjustable-height insert of any of paragraphs A1-A20, wherein the threaded adjustable-height insert is configured such that the overall height is adjustable via radial movement of the second insert part with respect to the first insert part.

A22. The threaded adjustable-height insert of any of paragraphs A1-A21, wherein the threaded adjustable-height insert is configured such that the overall height is adjustable by rotating the second insert part with respect to the first insert part.

A23. The threaded adjustable-height insert of any of paragraphs A1-A22, wherein the threaded adjustable-height insert is configured such that the overall height is adjustable by expanding a portion of the second insert part.

A24. The threaded adjustable-height insert of any of paragraphs A1-A23, wherein the threaded adjustable-height insert is configured such that the overall height is adjustable without requiring access to the first flange of the first insert part.

A25. The threaded adjustable-height insert of any of paragraphs A1-A24, wherein the threaded adjustable-height insert is configured to be inserted into a/the sandwich panel when only one of a/the first skin and a/the second skin is accessible.

A26. The threaded adjustable-height insert of any of paragraphs A1-A25, wherein a first diameter of the second flange, adjacent the second upper surface, is approximately equal to a bore diameter of a/the bore in a/the sandwich panel.

A26.1. The threaded adjustable-height insert of any of paragraphs A1-A26, wherein a/the first diameter of the second flange, adjacent the second upper surface, is slightly smaller than a/the bore diameter of a/the bore in a/the sandwich panel.

A27. The threaded adjustable-height insert of any of paragraphs A1-A26.1, wherein the first outer surface of the first neck comprises a first threaded portion.

A28. The threaded adjustable-height insert of any of paragraphs A1-A27, wherein the first outer surface of the first neck is threaded along substantially its entire length.

A29. The threaded adjustable-height insert of any of paragraphs A1-A28, wherein the first outer surface of the first neck is threaded with a double threaded pitch.

A30. The threaded adjustable-height insert of any of paragraphs A1-A29, wherein the second inner surface of the second neck comprises a second threaded portion.

A31. The threaded adjustable-height insert of any of paragraphs A1-A30, wherein the second inner surface of the second neck is threaded along substantially its entire length.

A32. The threaded adjustable-height insert of any of paragraphs A1-A31, wherein the second inner surface of the second neck is threaded with a double threaded pitch.

A33. The threaded adjustable-height insert of any of paragraphs A1-A32, wherein the first outer surface of the first neck comprises one or more first thread engagement clips configured to engage the second inner surface of the second neck.

A34. The threaded adjustable-height insert of paragraph A33, wherein the one or more first thread engagement clips are spaced apart, substantially equidistantly, about the first outer surface of the first neck.

A35. The threaded adjustable-height insert of paragraph A33 or A34, wherein the one or more first thread engagement clips are positioned adjacent the first neck end region.

A36. The threaded adjustable-height insert of any of paragraphs A33-A35, wherein the one or more first thread engagement clips project radially outward from the first outer surface of the first neck.

A37. The threaded adjustable-height insert of any of paragraphs A33-A36, wherein each of the one or more first thread engagement clips comprise a partial thread.

A37.1. The threaded adjustable-height insert of any of paragraphs A33-A37, wherein each of the one or more first thread engagement clips is configured to engage a/the second threaded portion of the second neck.

A38. The threaded adjustable-height insert of any of paragraphs A1-A37.1, wherein the second inner surface of the second neck comprises one or more second thread engagement clips configured to engage the first outer surface of the first neck.

A38.1. The threaded adjustable-height insert of paragraph A38, wherein each of the one or more second thread engagement clips is configured to engage a/the first threaded portion of the first neck.

A39. The threaded adjustable-height insert of paragraph A38 or A38.1, wherein the one or more second thread engagement clips are spaced apart, substantially equidistantly, about the second inner surface of the second neck.

A40. The threaded adjustable-height insert of any of paragraphs A38-A39, wherein the one or more second thread engagement clips are positioned adjacent the second neck end region.

A41. The threaded adjustable-height insert of any of paragraphs A38-A40, wherein the one or more second thread engagement clips project radially inward from the second inner surface of the second neck.

A42. The threaded adjustable-height insert of any of paragraphs A38-A41, wherein each of the one or more second thread engagement clips comprises a partial thread.

A42.1. The threaded adjustable-height insert of any of paragraphs A38-A42, wherein each of the one or more second thread engagement clips is configured to engage a/the second threaded portion of the second neck such that rotation of the second insert part with respect to the first insert part causes the thread engagement clips to travel along the second threaded portion.

A43. The threaded adjustable-height insert of any of paragraphs A1-A42.1, wherein the second neck comprises one or more longitudinally-extending slots.

A44. The threaded adjustable-height insert of paragraph A43, wherein at least one of the one or more longitudinally-extending slots is formed through the entire thickness of the second neck, from the second outer surface of the second neck to the second inner surface of the second neck.

A45. The threaded adjustable-height insert of paragraph A43 or A44, wherein at least one of the one or more longitudinally-extending slots is formed through a portion of the thickness of the second neck.

A46. The threaded adjustable-height insert of any of paragraphs A43-A45, wherein the one or more longitudinally-extending slots are configured to allow radial expansion of at least a portion of the second neck.

A47. The threaded adjustable-height insert of any of paragraphs A43-A46, wherein the one or more longitudinally-extending slots are spaced relative to one another so as to form one or more pairs of longitudinally-extending slots, such that a radially-expandable tab is formed between each respective adjacent pair of longitudinally-extending slots.

A48. The threaded adjustable-height insert of paragraph A47, wherein each radially-expandable tab comprises a respective second thread engagement clip positioned on the respective portion of the second inner surface of the second neck corresponding to each radially-expandable tab.

A49. The threaded adjustable-height insert of paragraph A48, wherein the second insert part is configured to be operatively positioned with respect to the first insert part by radially expanding each of the one or more radially-expandable tabs such that the second thread engagement clips are longitudinally passed over one or more threads of a/the first threaded portion of the first insert part, when the second insert part is operatively positioned with respect to the first insert part, and as the second insert part is longitudinally moved with respect to the first insert part.

A49.1. The threaded adjustable-height insert of paragraph A48 or A49, wherein the second thread engagement clips are configured to grip a/the first threaded portion of the first insert part when the second insert part is operatively positioned with respect to the first insert part.

A49.2. The threaded adjustable-height insert of any of paragraphs A47-A49.1, wherein the second insert part is configured to be longitudinally moved with respect to the first insert part by radially expanding the radially-expandable tabs and ratcheting the second thread engagement clips along a/the first threaded portion.

A50. The threaded adjustable-height insert of any of paragraphs A43-A49.1, wherein the one or more longitudinally-extending slots are formed in a/the second threaded portion of the second inner surface of the second neck, such that the second threaded portion is discontinuous at each of the one or more longitudinally-extending slots.

A50.1. The threaded adjustable-height insert of paragraph A50, wherein each of the longitudinally-extending slots is configured to receive a respective first thread engagement clip positioned on the first outer surface of the first neck of the first insert part, such that each first thread engagement clip is configured to slide longitudinally along a respective longitudinally-extending slot when the second insert part is operatively positioned with respect to the first insert part.

A51. The threaded adjustable-height insert of any of paragraphs A43-A50.1, wherein the one or more longitudinally-extending slots extend longitudinally from the second end region of the second neck towards the second flange, along at least a portion of the length of the second neck.

A52. The threaded adjustable-height insert of any of paragraphs A43-A51, wherein the one or more longitudinally-extending slots extend longitudinally from the second end region of the second neck to adjacent the second flange.

A53. The threaded adjustable-height insert of any of paragraphs A1-A52, wherein the first neck comprises one or more longitudinally-extending channels.

A54. The threaded adjustable-height insert of paragraph A53, wherein the one or more longitudinally-extending channels extend from the first end region of the first neck of the first insert part towards the first flange of the first insert part.

A55. The threaded adjustable-height insert of paragraph A53 or A54, wherein the one or more longitudinally-extending channels are formed radially outward from the first inner surface of the first neck of the first insert part.

A56. The threaded adjustable-height insert of any of paragraphs A53-A55, wherein the one or more longitudinally-extending channels are spaced apart from one another, substantially equidistantly, about the first inner surface of the first neck.

A57. The threaded adjustable-height insert of any of paragraphs A53-A56, wherein the one or more longitudinally-extending channels are staggered with respect to one or more first thread engagement clips positioned on the first outer surface of the first neck.

A58. The threaded adjustable-height insert of any of paragraphs A53-A57, wherein the one or more longitudinally-extending channels are configured to engage a tool that is configured to substantially prevent rotation of the first insert part as the second insert part is rotated with respect to the first insert part, when the second insert part is operatively positioned with respect to the first insert part.

A59. The threaded adjustable-height insert of any of paragraphs A53-A58, wherein the one or more longitudinally-extending channels are accessible via the second hole of the second insert part when the second insert part is operatively positioned with respect to the first insert part.

A60. The threaded adjustable-height insert of any of paragraphs A53-A59, wherein the one or more longitudinally-extending channels are accessible via the first hole of the first insert part.

A61. The threaded adjustable-height insert of any of paragraphs A1-A60, wherein the first insert part and the second insert part are slidably translatable and rotatable relative to each other.

A62. The threaded adjustable-height insert of any of paragraphs A1-A61, wherein the threaded adjustable-height insert is configured such that longitudinally sliding the second insert part with respect to the first insert part such that the second flange is moved towards the first flange reduces the overall height of the threaded adjustable-height insert.

A63. The threaded adjustable-height insert of any of paragraphs A1-A62, wherein the threaded adjustable-height insert is configured such that selectively rotating the second insert part with respect to the first insert part adjusts the overall height of the threaded adjustable-height insert.

A64. The threaded adjustable-height insert of any of paragraphs A1-A63, wherein the threaded adjustable-height insert is configured such that selectively rotating the second insert part with respect to the first insert part in a first direction reduces the overall height of the threaded adjustable-height insert, and such that selectively rotating the second insert part with respect to the first insert part in a second direction increases the overall height of the threaded adjustable-height insert, wherein the second direction is opposite the first direction.

A65. The threaded adjustable-height insert of any of paragraphs A1-A64, wherein the threaded adjustable-height insert is configured such that longitudinally sliding the second insert part with respect to the first insert part coarsely adjusts the overall height of the threaded adjustable-height insert.

A66. The threaded adjustable-height insert of any of paragraphs A1-A65, wherein the threaded adjustable-height insert is configured such that rotating the second insert part with respect to the first insert part finely adjusts the overall height of the threaded adjustable-height insert.

B1. A sandwich panel, comprising:
a first skin having a first inner surface and a first outer surface opposite the first inner surface;
a second skin opposite the first skin, the second skin having a second inner surface and a second outer surface opposite the second inner surface, and the first outer surface and the second outer surface facing away from one another;
a core sandwiched between the first inner surface of the first skin and the second inner surface of the second skin;
at least one bore formed in at least one of the first skin and the second skin, and extending into the core; and
at least one threaded adjustable-height insert, each threaded adjustable-height insert of the at least one threaded adjustable-height inserts being the threaded adjustable-height insert of any of paragraphs A1-A66, installed in a respective bore of the at least one bores of the sandwich panel.

B1.1. The sandwich panel of paragraph B1, wherein at least one of the at least one bores is formed in the first skin and extends into the core towards the second skin.

B1.2. The sandwich panel of paragraph B1 or B1.1, wherein at least one of the at least one bores is formed in the second skin and extends into the core towards the first skin.

B2. The sandwich panel of any of paragraphs B1-B1.2, wherein the at least one threaded adjustable-height insert comprises a plurality of threaded adjustable-height inserts, wherein each threaded adjustable-height insert of the plurality of threaded adjustable-height inserts is installed in a respective one of the at least one bores.

B3. The sandwich panel of any of paragraphs B1-B2, wherein the core comprises one or more of foam, aluminum, Nomex® (aramid), carbon, Korex, Kevlar®, fiberglass, polyethersulfone, polyvinylchloride, polyurethane, polyethylene foam, polystyrene foam, balsa wood, syntactic foam, a honeycomb structure, a polymer honeycomb, a thermoplastic honeycomb, stainless steel, polycarbonate, and polypropylene.

B4. The sandwich panel of any of paragraphs B1-B3, wherein the first skin comprises one or more of a laminate of fiber-reinforced polymer, a thermoset polymer, an epoxy, sheet metal, carbon, aramid, aluminum, steel, plywood, balsa, teak, and hardwood.

B5. The sandwich panel of any of paragraphs B1-B4, wherein the second skin comprises one or more of a laminate of fiber-reinforced polymer, a thermoset polymer, an epoxy, sheet metal, carbon, aramid, aluminum, steel, plywood, balsa, teak, and hardwood.

B6. The sandwich panel of any of paragraphs B1-B5, wherein the sandwich panel comprises a composite panel.

B7. The sandwich panel of any of paragraphs B1-B6, wherein the core comprises a honeycomb core.

B8. The sandwich panel of any of paragraphs B1-B7, wherein the core comprises a closed-cell structure.

B9. The sandwich panel of any of paragraphs B1-B8, wherein the core comprises an open-cell structure.

B10. The sandwich panel of any of paragraphs B1-B9, wherein an opposing end of at least one of the at least one threaded adjustable-height inserts is embedded within the core of the sandwich panel.

B11. The sandwich panel of any of paragraphs B1-B10, wherein the second upper surface of the second flange of at least one of the at least one threaded adjustable-height inserts is at least substantially flush with the first outer surface of the first skin.

B11.1. The sandwich panel of paragraph B11, wherein the first lower surface of the first flange of at least one of the at least one threaded adjustable-height inserts is at least substantially flush with the second outer surface of the second skin.

B12. The sandwich panel of any of paragraphs B1-B11.1, wherein the second upper surface of the second flange of at least one of the at least one threaded adjustable-height inserts is at least substantially flush with the second outer surface of the second skin.

B12.1. The sandwich panel of paragraph B12, wherein the first lower surface of the first flange of at least one of the at least one threaded adjustable-height inserts is at least substantially flush with the first outer surface of the first skin.

B13. The sandwich panel of any of paragraphs B1-B12.1, wherein the at least one bore comprises a plurality of bores, each respective bore of the plurality of bores extending from at least one of the first skin and the second skin, and into the core, wherein the at least one threaded adjustable-height insert comprises a plurality of threaded adjustable-height inserts, and wherein at least one of the plurality of threaded adjustable-height inserts is installed within each respective bore of the plurality of bores.

B14. The sandwich panel of any of paragraphs B1-B13, wherein each bore of the at least one bores comprises a substantially cylindrical bore formed at least partly through the core.

B15. The sandwich panel of any of paragraphs B1-B14, further comprising one or more of a potting compound, a quick cure compound, and a UV-cure compound inserted between the core of the sandwich panel and the second neck of at least one of the at least one threaded adjustable-height inserts.

B16. The sandwich panel of any of paragraphs B1-B15, further comprising one or more of a/the potting compound, a/the quick cure compound, and a/the UV-cure compound inserted between the core of the sandwich panel and a/the anti-rotation feature of at least one of the at least one threaded adjustable-height inserts.

C1. An apparatus including at least one sandwich panel according to any of paragraphs B1-B16.

C2. The apparatus of paragraph C1, wherein the apparatus comprises one or more of an aircraft, a satellite, an antenna, a transit vehicle, a shipping container, an automobile, and a shelter.

C3. The apparatus of any of paragraphs C1-C2, wherein the sandwich panel forms a portion of one or more of a floor, a galley, an interior main structure, a secondary structure, an interior wall, a stow bin, an overhead compartment, a lavatory, a capsule panel, a nose cone, an instrumentation enclosure, a bulkhead panel, a curtain wall, a partition, and a divider panel in the apparatus.

D1. A method of installing a threaded adjustable-height insert into a sandwich panel, the method comprising:

installing at least one threaded adjustable-height insert of any of paragraphs A1-A66 into a respective one of at least one bores in the sandwich panel such that at least a portion of the first neck and at least a portion of the second neck of the threaded adjustable-height insert are positioned within the respective bore in a core of the sandwich panel; and adjusting a height of the threaded adjustable-height insert until the second upper surface of the second flange is at least substantially flush with an outer surface of the sandwich panel.

D1.1 The method of paragraph D1, further comprising forming the at least one bore in the sandwich panel, the sandwich panel having a first skin having a first inner surface and an opposite first outer surface, a second skin opposite the first skin, the second skin having a second inner surface and an opposite second outer surface, the first outer surface and the second outer surface facing away from one another, and the core being sandwiched between the first inner surface of the first skin and the second inner surface of the second skin, wherein the forming the at least one bore comprises forming at least one bore such that it extends through at least one of the first skin and the second skin, and into the core.

D1.2. The method of paragraph D1.1, wherein the forming the at least one bore in the sandwich panel is automated.

D2. The method of paragraph D1.1 or D1.2, wherein the forming the at least one bore comprises forming at least one blind bore that extends only partially into a thickness of the core of the sandwich panel.

D3. The method of any of paragraphs D1.1-D2, wherein the forming the at least one bore comprises forming a plurality of blind bores in the sandwich panel.

D4. The method of any of paragraphs D1.1-D3, wherein the forming the at least one bore comprises forming at least one through-bore that extends through the first skin, the second skin, and a/the thickness of the core of the sandwich panel.

D5. The method of any of paragraphs D1.1-D4, wherein the forming the at least one bore comprises one or more of drilling, milling, and punching.

D6. The method of any of paragraphs D1.1-D5, wherein the forming the at least one bore comprises forming at least one circular bore through at least a portion of a/the thickness of the core of the sandwich panel.

D7. The method of any of paragraphs D1.1-D6, wherein the forming the at least one bore comprises forming a plurality of bores, and wherein the installing at least one threaded adjustable-height insert comprises installing a plurality of threaded adjustable-height inserts, each respective threaded adjustable-height insert of the plurality of threaded adjustable-height inserts being installed into a respective bore of the plurality of bores.

D8. The method of any of paragraphs D1-D7, further comprising inserting at least one secondary object within the respective first hole and second hole of a respective threaded adjustable-height insert of the at least one threaded adjustable-height inserts, the at least one secondary object being configured to transfer a localized load to the sandwich panel via the threaded adjustable-height insert.

D9. The method of any of paragraphs D1-D8, further comprising injecting one or more of a potting compound, a quick-cure adhesive, and a UV-cure adhesive into a space between the second neck of the threaded adjustable-height insert and the core of the sandwich panel, inside the respective bore.

D9.1. The method of any of paragraphs D1-D9, comprising injecting one or more of a/the potting compound, a/the quick-cure adhesive, and a/the UV-cure adhesive into a respective one of the at least one bores, adjacent a/the anti-rotation feature of the threaded adjustable-height insert.

D10. The method of any of paragraphs D1-D9.1, wherein the installing the at least one threaded adjustable-height insert into the respective one of the at least one bores is automated.

D11. The method of any of paragraphs D1-D10, wherein the installing the at least one threaded adjustable-height insert into the respective one of the at least one bores comprises operatively positioning the second insert part with respect to the first insert part.

D11.1. The method of paragraph D11, wherein the installing the at least one threaded adjustable-height insert comprises first inserting the first insert part into the respective bore and then inserting the second insert part into the respective bore such that the second inner surface of the second neck is at least partially positioned on the first outer surface of the first neck.

D12. The method of any of paragraphs D1-D11.1, wherein the installing the at least one threaded adjustable-height insert into the respective one of the at least one bores comprises inserting the second insert part with respect to the first insert part such that the first hole and the second hole are substantially concentric.

D13. The method of any of paragraphs D1-D12, wherein the installing the at least one threaded adjustable-height insert into the respective one of the at least one bores comprises positioning the first flange adjacent a base of the bore, such that the first neck extends into the bore from within the bore.

D13.1. The method of any of paragraphs D1-D13, wherein the installing the at least one threaded adjustable-height insert into the respective one of the at least one bores comprises positioning the first flange adjacent a/the first skin or a/the second skin of the sandwich panel, such that the first neck extends into the bore and towards the other of the first skin and the second skin.

D14. The method of any of paragraphs D1-D13.1, wherein the installing the at least one threaded adjustable-height insert into the respective one of the at least one bores comprises positioning the second insert part such that the second neck is positioned between the first flange of the first insert part and the second flange of the second insert part.

D15. The method of any of paragraphs D1-D14, wherein the adjusting the height of the threaded adjustable-height insert comprises adjusting the height of the adjustable-height insert until the second upper surface of the second flange is at least substantially flush with an outer surface of one of a/the first skin and a/the second skin of the sandwich panel.

D16. The method of any of paragraphs D1-D15, wherein the adjusting the height of the threaded adjustable-height insert comprises moving the second flange with respect to and towards the first flange.

D17. The method of any of paragraphs D1-D16, wherein the adjusting the height of the threaded adjustable-height insert comprises moving the second neck with respect to and towards the first flange.

D18. The method of any of paragraphs D1-D17, wherein the adjusting the height of the adjustable-height insert comprises engaging a threaded engagement between the first neck and the second neck.

D19. The method of any of paragraphs D1-D18, wherein the adjusting the height of the threaded adjustable-height insert comprises reducing an overall height of the threaded adjustable-height insert.

D20. The method of any of paragraphs D1-D19, wherein the adjusting the height of the threaded adjustable-height insert comprises rotating the second insert part with respect to the first insert part.

D20.1. The method of paragraph D20, wherein the rotating the second insert part with respect to the first insert part finely adjusts the overall height of the threaded adjustable-height insert.

D21. The method of any of paragraphs D1-D20.1, wherein the adjusting the height of the threaded adjustable-height insert comprises longitudinally sliding the second insert part with respect to the first insert part.

D21.1. The method of paragraph D21, wherein the longitudinally sliding the second insert part with respect to the first insert part coarsely adjusts the overall height of the threaded adjustable-height insert.

D22. The method of any of paragraphs D1-D21.1, wherein the adjusting the height of the threaded adjustable-height insert comprises substantially preventing rotation of the first insert part while the second insert part is rotated with respect to the first insert part.

D23. The method of any of paragraphs D1-D22, wherein the adjusting the height of the threaded adjustable-height insert comprises sliding a/the first thread engagement clip of the first insert part along a/the longitudinally-extending slot within the second neck of the second insert part.

D24. The method of any of paragraphs D1-D23, wherein the adjusting the height of the threaded adjustable-height insert comprises rotating the second insert part with respect to the first insert part such that a/the first thread engagement clip of the first insert part engages a/the second threaded portion within the second neck of the second insert part.

D25. The method of any of paragraphs D1-D24, wherein the adjusting the height of the threaded adjustable-height insert comprises rotating the second insert part with respect to the first insert part such that a/the second thread engagement clip of the second insert part engages a/the first threaded portion on the first neck of the first insert part.

D26. The method of any of paragraphs D1-D25, wherein the adjusting the height of the threaded adjustable-height insert comprises radially expanding one or more radially-expandable tabs of the second insert part such that (the) second thread engagement clips are longitudinally passed over a/the first threaded portion of the first insert part.

D27. The method of any of paragraphs D1-D26, wherein the installing at least one threaded adjustable-height insert comprises operatively positioning the second insert part with respect to the first insert part.

D28. The method of paragraph D27, wherein the operatively positioning the second insert part with respect to the first insert part comprises positioning the second insert part such that the second inner surface of the second neck of the second insert part is adjacent the first outer surface of the first neck of the first insert part.

D29. The method of paragraph D27 or D28, wherein the operatively positioning the second insert part with respect to the first insert part comprises first inserting the first insert part into the respective bore and then inserting the second insert part into the respective bore such that the second inner surface of the second neck is at least partially positioned on the first outer surface of the first neck.

D30. The method of any of paragraphs D27-D29, wherein the operatively positioning the second insert part with respect to the first insert part comprises positioning the second insert part with respect to the first insert part such that the first hole and the second hole are substantially concentric.

D31. The method of any of paragraphs D1-D30, wherein the installing the at least one threaded adjustable-height insert into the respective one of the at least one bores comprises positioning the first flange adjacent a/the base of the bore, such that the first neck extends into the bore from within the bore.

D32. The method of any of paragraphs D1-D31, wherein the installing the at least one adjustable-height insert into the respective one of the at least one bores comprises positioning the first flange adjacent a/the first skin or a/the second skin of the sandwich panel, such that the first neck extends into the bore and towards the other of the first skin and the second skin.

D33. The method of any of paragraphs D1-D32, wherein the installing the at least one adjustable-height insert into the respective one of the at least one bores comprises positioning the second insert part such that the second neck is positioned between the first flange of the first insert part and the second flange of the second insert part.

E1. Use of the threaded adjustable-height insert of any of paragraphs A1-A66 to receive a/the secondary object within the first hole and the second hole of the threaded adjustable-height insert, to transfer a/the localized load to a/the sandwich panel via the threaded adjustable-height insert when the threaded adjustable-height insert is installed within the sandwich panel.

F1. Use of the sandwich panel of any of paragraphs B1-B16 to construct a portion of one or more of an aircraft, a satellite, an antenna, a transit vehicle, a shipping container, an automobile, and a shelter.

G1. A system, comprising:
a plurality of first threaded adjustable-height inserts, wherein each first threaded adjustable-height insert of the plurality of first threaded adjustable-height inserts comprises a threaded adjustable-height insert of any of paragraphs A1-A66 having a first minimum overall height and a first maximum overall height when the respective second insert part is operatively positioned with respect to the respective first insert part of each respective first threaded adjustable-height insert; and a plurality of second threaded adjustable-height inserts, wherein each second threaded adjustable-height insert of the plurality of second threaded adjustable-height inserts comprises a threaded adjustable-height insert of any of paragraphs A1-A66 having a second minimum overall height and a second maximum overall height when the respective second insert part is operatively positioned with respect to the respective first insert part of each respective second threaded adjustable-height insert, wherein the second minimum overall height of each second threaded adjustable-height insert is greater than the first minimum overall height of each first threaded adjustable-height insert, and wherein the second maximum overall height of each second threaded adjustable-height insert is greater than the first maximum overall height of each first threaded adjustable-height insert.

G2. The system of paragraph G1, wherein a second adjustment range of each second threaded adjustable-height insert is greater than a first adjustment range of each first threaded adjustable-height insert, wherein the second adjustment range is defined as the difference between the second maximum overall height and the second minimum overall height, and wherein the first adjustment range is defined as the difference between the first maximum overall height and the first minimum overall height.

G3. The system of paragraph G1 or G2, further comprising a plurality of third threaded adjustable-height inserts, wherein each third threaded adjustable-height insert of the plurality of third threaded adjustable-height inserts comprises a threaded adjustable-height insert of any of paragraphs A1-A66 having a third minimum overall height and a third maximum overall height when the respective second insert part is operatively positioned with respect to the respective first insert part of each respective third threaded adjustable-height insert, wherein the third minimum overall height of each third threaded adjustable-height insert is greater than the second minimum overall height of each second threaded adjustable-height insert, and wherein the third maximum overall height of each third threaded adjustable-height insert is greater than the second maximum overall height of each second threaded adjustable-height insert.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A threaded adjustable-height insert, comprising:
 a first insert part comprising:
  a first flange having a first upper surface and a first lower surface;
  a first neck extending from the first upper surface of the first flange to a first neck end region; and
  a first hole extending at least through the first neck and defined at least partially by a first inner surface of the first neck, wherein the first neck comprises a first outer surface opposite the first inner surface; and
 a second insert part comprising:
  a second flange having a second upper surface and a second lower surface;
  a second neck extending from the second lower surface of the second flange to a second neck end region; and
  a second hole extending through the second neck and the second flange, wherein the second hole is partially defined by a second inner surface of the second neck, and wherein the second neck comprises a second outer surface opposite the second inner surface;
 wherein the second insert part is configured to be selectively operatively positioned with respect to the first insert part such that the second inner surface of the second neck has a threaded engagement with at least a portion of the first neck, wherein the threaded adjustable-height insert is configured to have a selectively adjustable overall height such that moving the second insert part with respect to the first insert part such that the second flange is moved towards the first flange reduces the overall height of the threaded adjustable-height insert, wherein the overall height of the threaded adjustable-height insert is defined as a perpendicular distance between the second upper surface of the second flange and the first lower surface of the first flange, wherein the first hole and the second hole are at least substantially concentric when the second insert part is operatively positioned with respect to the first insert part, and wherein the first insert part and the second insert part are configured to both longitudinally slidably translate relative to each other and rotate relative to each other when the second insert part is operatively positioned with respect to the first insert part.

2. The threaded adjustable-height insert according to claim 1, wherein the threaded adjustable-height insert is configured to be installed within a bore of a sandwich panel, and wherein the threaded adjustable-height insert further comprises an anti-rotation feature configured to resist rotation of the first insert part with respect to the sandwich panel, as the second insert part is rotated with respect to the first insert part, once the second insert part is operatively positioned with respect to the first insert part and the threaded adjustable-height insert is inserted in the bore of the sandwich panel.

3. The threaded adjustable-height insert according to claim 2, wherein the anti-rotation feature comprises a plurality of projections radially extending from a peripheral edge region of the first flange.

4. The threaded adjustable-height insert according to claim 1, wherein the threaded adjustable-height insert is configured such that the overall height is adjustable by longitudinally sliding the second insert part with respect to the first insert part and by rotating the second insert part with respect to the first insert part.

5. The threaded adjustable-height insert according to claim 1, wherein the first outer surface of the first neck comprises a first threaded portion.

6. The threaded adjustable-height insert according to claim 5, wherein the second inner surface of the second neck comprises one or more thread engagement clips configured to engage the first threaded portion of the first neck, wherein the one or more thread engagement clips are positioned adjacent the second neck end region, wherein the one or more thread engagement clips project radially inward from the second inner surface of the second neck.

7. The threaded adjustable-height insert according to claim 6, wherein the second neck comprises one or more pairs of longitudinally-extending slots spaced relative to one another so as to form a radially-expandable tab between each respective adjacent pair of longitudinally-extending slots, wherein each thread engagement clip is positioned on a respective radially-expandable tab, wherein the thread engagement clips are configured to grip the first threaded portion of the first insert part when the second insert part is operatively positioned with respect to the first insert part, and wherein the second insert part is configured to be longitudinally moved with respect to the first insert part by radially expanding the radially-expandable tabs and ratcheting the thread engagement clips along the first threaded portion.

8. The threaded adjustable-height insert according to claim 1, wherein the second inner surface of the second neck comprises a second threaded portion.

9. The threaded adjustable-height insert according to claim 8, wherein the first outer surface of the first neck comprises one or more thread engagement clips configured to engage the second threaded portion of the second neck, wherein the one or more thread engagement clips are positioned adjacent the first neck end region, wherein the one or more thread engagement clips project radially outward from the first outer surface of the first neck, and wherein each of the one or more thread engagement clips comprises a partial thread such that rotation of the second insert part with respect to the first insert part causes the thread engagement clips to engage with and travel along the second threaded portion.

10. The threaded adjustable-height insert according to claim 9, wherein the second insert part comprises one or more longitudinally-extending slots formed in the second threaded portion of the second inner surface of the second neck, such that the second threaded portion is discontinuous at each of the one or more longitudinally-extending slots, wherein each of the longitudinally-extending slots is configured to receive a respective thread engagement clip such that each thread engagement clip is configured to slide longitudinally along a respective longitudinally-extending slot when the second insert part is operatively positioned with respect to the first insert part.

11. The threaded adjustable-height insert according to claim 1, wherein the threaded adjustable-height insert is configured such that the overall height of the threaded adjustable-height insert is adjustable once the first insert part and the second insert part are at least partially inserted into a bore of a sandwich panel.

12. The threaded adjustable-height insert according to claim 1 in combination with a sandwich panel, wherein the threaded adjustable-height insert is configured to be installed in a bore of the sandwich panel, the sandwich panel comprising a first skin, a second skin opposite the first skin, and a core therebetween, and wherein the threaded adjustable-height insert is configured such that the second upper surface of the second flange is at least substantially flush with one of the first skin and the second skin of the sandwich panel when the second insert part is operatively positioned with respect to the first insert part and the threaded adjustable-height insert is installed in the bore of the sandwich panel.

13. A sandwich panel, comprising:
- a first skin having a first inner surface and a first outer surface opposite the first inner surface;
- a second skin opposite the first skin, the second skin having a second inner surface and a second outer surface opposite the second inner surface, and the first outer surface and the second outer surface facing away from one another;
- a core sandwiched between the first inner surface of the first skin and the second inner surface of the second skin;
- at least one bore formed in at least one of the first skin and the second skin, and extending into the core; and
- at least one threaded adjustable-height insert according to claim 1, each threaded adjustable-height insert of the at least one threaded adjustable-height inserts being installed in a respective bore of the sandwich panel.

14. The threaded adjustable-height insert according to claim 1, wherein the first lower surface of the first flange of the first insert part faces the second lower surface of the second flange of the second insert part when the second insert part is operatively positioned with respect to the first insert part.

15. The threaded adjustable-height insert according to claim 1, wherein the second insert part is oriented such that the second neck is positioned between the first flange of the first insert part and the second flange of the second insert part when the second insert part is operatively positioned with respect to the first insert part.

* * * * *